United States Patent
DeVaul

(10) Patent No.: US 11,375,722 B2
(45) Date of Patent: Jul. 5, 2022

(54) EDIBLE FOOD DIVIDERS AND METHODS AND KITS RELATED THERETO

(71) Applicant: YOGEEZ II, INC., Marshalltown, IA (US)

(72) Inventor: Amanda Renée DeVaul, Marshalltown, IA (US)

(73) Assignee: YOGEEZ II, INC., Marshalltown, IA (US)

( * ) Notice: Subject to any disclaimer, the term of this patent is extended or adjusted under 35 U.S.C. 154(b) by 585 days.

(21) Appl. No.: 14/067,234

(22) Filed: Oct. 30, 2013

(65) Prior Publication Data

US 2014/0050820 A1     Feb. 20, 2014

Related U.S. Application Data

(63) Continuation-in-part of application No. 13/987,870, filed on Dec. 31, 2011, now abandoned.

(51) Int. Cl.
| | | |
|---|---|---|
| *A21D 13/00* | (2017.01) | |
| *A21D 13/45* | (2017.01) | |
| *A21D 13/48* | (2017.01) | |

(52) U.S. Cl.
CPC .............. *A21D 13/45* (2017.01); *A21D 13/48* (2017.01)

(58) Field of Classification Search
CPC ....................................................... A21D 13/008
USPC ................................................... 426/76, 391
See application file for complete search history.

(56) References Cited

U.S. PATENT DOCUMENTS

| | | | | |
|---|---|---|---|---|
| 1,950,734 A | * | 3/1934 | Leaf | 426/95 |
| 2,045,183 A | * | 6/1936 | Fowle | B65D 5/48038 |
| | | | | 426/119 |
| 2,283,032 A | * | 5/1942 | Baxter | A21B 3/133 |
| | | | | 220/23.2 |
| 2,714,070 A | * | 7/1955 | Welch | B65D 81/3453 |
| | | | | 426/138 |
| 2,991,814 A | * | 7/1961 | Popeil | B26D 1/25 |
| | | | | 83/105 |
| 4,068,007 A | * | 1/1978 | Forkner | A21C 15/02 |
| | | | | 426/106 |
| 4,820,533 A | * | 4/1989 | Seaborne | A23B 4/10 |
| | | | | 426/94 |

(Continued)

FOREIGN PATENT DOCUMENTS

| | | |
|---|---|---|
| WO | 2006/089084 A2 | 8/2006 |
| WO | 2006/102710 A1 | 10/2006 |

(Continued)

OTHER PUBLICATIONS

Soltice Cookies NPL, http://leslieland.com/2007/12/gardener%E2%80%99s-holiday-%E2%80%93-solstice-cookies/, Dec. 14, 2007.*

(Continued)

*Primary Examiner* — Erik Kashnikow
*Assistant Examiner* — Ashley Axtell
(74) *Attorney, Agent, or Firm* — Westman, Champlin & Koehler, P.A.; Amanda M. Prose

(57) ABSTRACT

A food divider comprises at least one frangible edible food divider configured to fit within a container and adapted to provide a physical barrier between at least two different types, amounts and/or flavors of food products, such as frozen food products. Related methods and kits are also described.

28 Claims, 14 Drawing Sheets

(56) References Cited

U.S. PATENT DOCUMENTS

| | | | |
|---|---|---|---|
| 4,874,618 A * | 10/1989 | Seaborne | B65D 81/3453 426/94 |
| D671,376 S | 11/2012 | Reiser | |
| 2002/0039612 A1 * | 4/2002 | Gambino et al. | 426/283 |
| 2003/0157221 A1 | 8/2003 | Sharman | |
| 2004/0166207 A1 * | 8/2004 | Vincent | A23G 9/44 426/106 |
| 2005/0287277 A1 * | 12/2005 | Hopkins | A21D 15/00 426/594 |
| 2006/0068065 A1 | 3/2006 | Rettey et al. | |
| 2009/0078125 A1 | 3/2009 | Pawlick et al. | |
| 2009/0211941 A1 * | 8/2009 | Maroofian | B65D 75/24 206/776 |
| 2014/0025508 A1 * | 1/2014 | Bartosch | B65D 25/04 40/538 |

FOREIGN PATENT DOCUMENTS

| | | |
|---|---|---|
| WO | 2007/005063 A1 | 1/2007 |
| WO | 2012/040344 A2 | 3/2012 |

OTHER PUBLICATIONS

Icecream NPL, https://www.eatthelove.com/red-wine-caramel-apple-ice-cream/, Dec. 1, 2011.*

Mexican Substantive Examination Report received for Mexican patent application No. MX/a/2014/013190, dated Aug. 8, 2017, 3 pages.

Alexander, David, "Local Business Owner Patents Frozen Yogurt Idea", http://www.timesrepublican.com/page/content.detail/id/548338/backLink, Apr. 6, 2012, 2 pages.

CarryOutSupplies.Com, "Yogurt Cups", <http://www.carryoutsupplies.com/category/yogurt-cups.html>, published prior to filing date, 1 page.

Hangzhou Meshine Trading Co. Ltd., "Wholesale Frozen Yogurt Cup", retrieved from Internet on Nov. 1, 2013 <http://www.alibaba.com/product-gs/733595355/wholesale_frozen_yogurt_cup.html>, published prior to filing date, 5 pages.

Kimber Cakeware, "Batter Babies", retrieved from Internet on Nov. 8, 2013, <http://kimbercakeware.com/batter_Babies.php>, published prior to filing date, 4 pages.

MyYogurtSupplies.Com, "Frozen Yogurt Supplies", retrieved from Internet on Nov. 1, 2013, http://www.myyogurtsupplies.com/Frozen-Yogurt-Supplies_c2.htm, published prior to filing date, 2 pages.

National Institute of Standards and Technology, "Method of Retail Sale", Sec.1.7.2.1 Method of Retail Sale, Uniform Regulation for the Method of Sale of Commodities, published prior to filing date, 10 pages.

"Purple Cherry", https://www.facebook.com/PurpleCherryFrozenYogurt?ref=hl, Mar. 5, 2013, 1 page.

Wagner, Bartosch, "How Does The Divider™ work for the Advertiser?", < http://www.yogurtdivider.com/advertising.html#6>, published prior to filing date, 2 pages.

Wagner, Bartosch, "Frozen Yogurt Cup Dividers", <http://www.yogurtdivider.com/>, published prior to filing date, 9 pages.

Wuhan Xinhengyue Industry & Trade Co. Ltd., "Custom Cup for Frozen Yogurt", http://kslu48me.en.alibaba.com/product/814546567-210413579/Custom_Cup_for_Frozen_Yogurt.html, published prior to filing date, 5 pages.

Notice of Allowance received for Canadian Patent Application No. 2,868,905, dated Feb. 12, 2016, 1 page.

* cited by examiner

EDIBLE FOOD DIVIDERS AND METHODS AND KITS RELATED THERETO

This application is a continuation-in-part of U.S. patent application Ser. No. 13/987,870 filed on Mar. 9, 2012, which is hereby incorporated by reference in its entirety.

BACKGROUND

Consumers are increasingly demanding more choices in terms of flavors and/or types of food products, often in a fast food or self-service setting. Such food products include frozen food products, such as frozen yogurt, which is typically offered in a wide variety of flavors, together with an assortment of toppings. These food products are typically dispensed into a single container where the various flavors and/or types of food products can comingle.

SUMMARY

In one embodiment, an edible food divider, such as an edible frozen food divider, is provided comprising at least one frangible edible food divider configured to fit within a container and adapted to provide a physical barrier between at least two different types, amounts and/or flavors of food products, such as frozen food products. Related methods and kits are also described.

In one embodiment, the edible food divider is a single layer product which serves as a physical barrier to keep different flavors and/or types of food products (e.g., frozen food products) physically separated, allowing the user to enjoy each flavor and/or type individually, thus increasing the enjoyment of the food product.

BRIEF DESCRIPTION OF THE DRAWINGS

The patent or application contains at least one drawing executed in color. Copies of this patent or patent application publication with color drawing(s) will be provided by the Office upon request and payment of the necessary fee.

DETAILED DESCRIPTION

Figure 1:
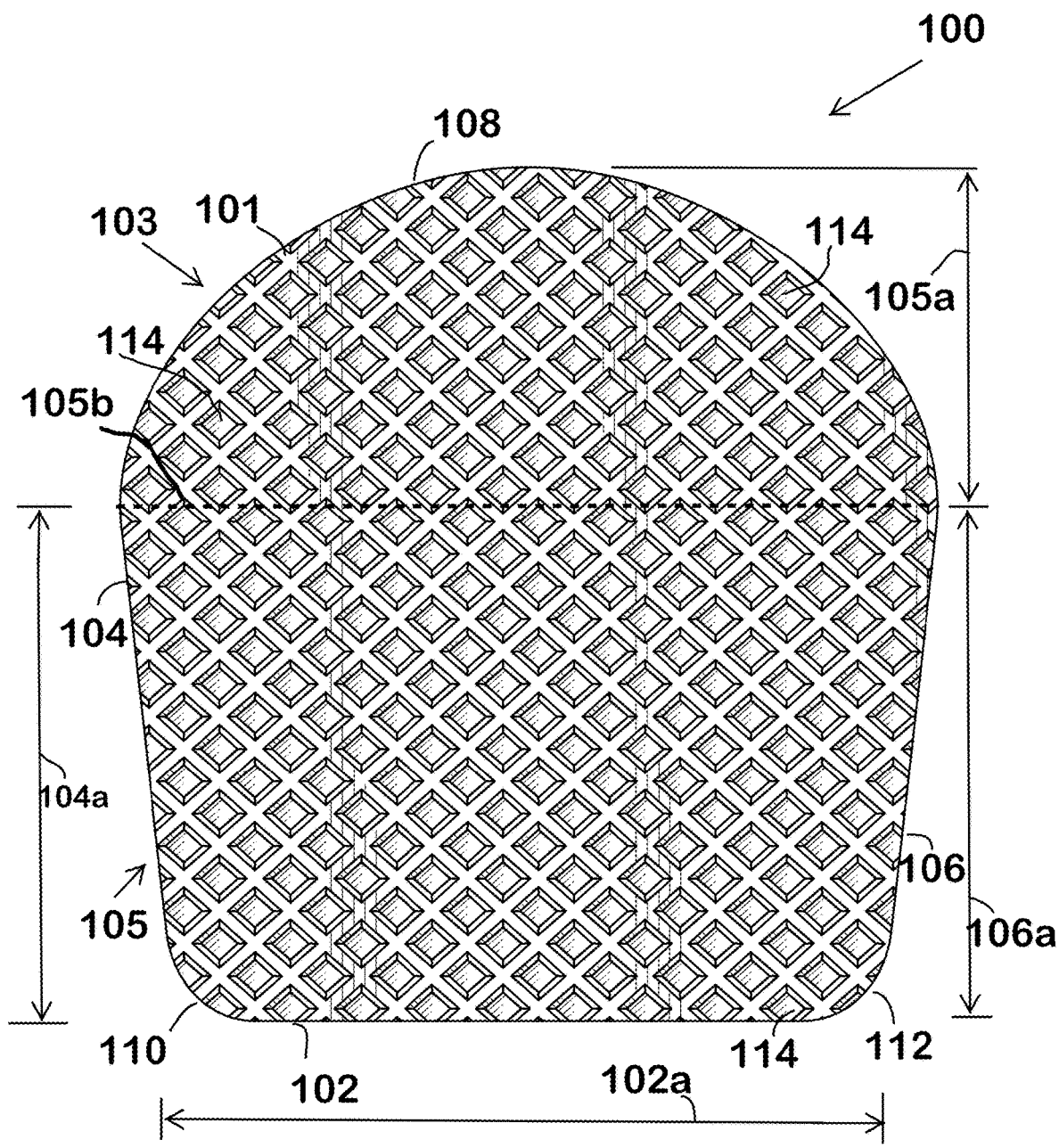
FIG. 1 is a front view of an edible food divider according to an embodiment.

In the following detailed description of embodiments of the invention, embodiments are described in sufficient detail to enable those skilled in the art to practice them, and it is to be understood that other embodiments may be utilized and that chemical and procedural changes may be made without departing from the spirit and scope of the present subject matter. The following detailed description is, therefore, not to be taken in a limiting sense, and the scope of embodiments of the present invention is defined only by the appended claims.

Consumers are increasingly demanding multiple flavors and/or multiple types of frozen foods, such as in a single serving container. This growing trend is evidenced, in part, by the rise in the number of self-serve frozen yogurt stores across the nation. Such stores offer a wide range of flavors and/or types of frozen yogurt, as well as toppings, for the consumer to choose from. However, when different flavors and/or toppings are provided in the same container, they can comingle, i.e., mix, thus preventing the consumer from enjoying each flavor individually. For flavors that are typically not consumed together, a negative experience can result, causing the consumer to associate such a retailer with bad tasting food or otherwise causing the consumer to decide not to try various flavor combinations.

Conventional paper-based dividers, such as the dividers described in http://www.yogurtdivider.com and WO/2012/040344, while capable of separating different flavors of frozen yogurt, were designed primarily to address problems associated with container construction and to provide an advertising unit. (See Abstract and Background of WO/2012/040344). Regardless, non-edible dividers fail to offer the consumer an enhanced edible dining experience. Furthermore, since paper is a required component of the product, the starting materials for conventional dividers necessarily require a plant-based non-food source, i.e., trees. Manufacture of conventional dividers is also expensive, not only because of the need to create a number of layers, including not only one or more layers of paper, but additional layers, such as wax or other liquid barriers. Manufacturing costs are also high because it is "imperative to use FDA approved food-safe materials, which adds additional costs." (See www.yogurtdivider.com/advertising.html#6). Furthermore, in some instances the paper layers are created by folding a single sheet of paper, which then requires lamination to hold the layers of paper together (Par. 21 of WO/2012/040344).

Conventional paper-based dividers are further limited to a size intended for use with containers that are no smaller than 16 ounces (oz.). Furthermore, since a conventional paper-based divider is considered an extension of the container it is in, and thus not comestible, the weight of a conventional divider must be deducted from the total weight, as required by the Uniform Laws and Regulations established by the National Institute of Standards and Technology, U.S. Department of Congress (other than in Wyoming or North Dakota). (See Uniform Regulation for the Method of Sale of Commodities sec. 1.7.2.1 Method of Retail Sale, Page 109). As such, unless advertising is used to offset the cost, the retailer may be burdened with an additional cost, without the benefit of being able to charge the consumer for its use. Furthermore, conventional paper-based dividers become waste after use, thus adding to the amount of trash produced in association with consumption of these food products.

In one embodiment, an edible food divider derived from a plant-based food source is provided which is frangible and which adds organoleptic benefits to the food product being consumed. Furthermore, and in contrast to a conventional paper divider, since the edible food divider is consumed, no additional waste is produced with this product. The edible food divider may also provide a retailer with an additional weight-based and/or value-based food product which provides an additional source of profit for the retailer. Related methods and kits are also disclosed.

When the terms "up," "down," "top," "bottom," "first," "second," "front," "back," "edge,", "side" and similar terms are used herein, it should be understood that these terms have reference only to the structure shown in the drawings as it would appear to a person viewing the drawings and are utilized only to facilitate describing embodiments of the invention. As such, these terms are not intended to be limiting in nature. Therefore, what is at one point in the process is described herein as a "bottom" may become a "top" at a later point in time, and so on.

The term "solid food product" as used herein refers to a food product which is not semi-solid or a liquid.

The term "semi-solid food product" as used herein, refers to a food product (or a collection of food products) which conforms, at least in part, to the container into which it is placed. Semi-solid food products can include foods which become "set" after a period of time. Such products include, but are not limited to, puddings, tapioca, yogurts, mousse, and cheesecakes, and the like. Semi-solid food products can also include cooked foods, such as mashed potatoes, cooked cereals (e.g., oatmeal, creamed wheat, and the like) and can include a mix of solid foods which have been softened by cooking, such as stuffing (e.g., a bread-based stuffing), and the like. Semi-solid food products can be consumed below, above or at ambient temperatures.

The term "frozen food" or "frozen food product" as used herein, refers to a semi-solid food product (or a collection of semi-solid food products) which is typically consumed while still frozen or otherwise while still cold. Once removed from freezing temperatures, a frozen food product can, at least initially, substantially maintain its original shape. However, upon dispensing or serving, or after a period of time (depending on initial temperature of the food product, ambient temperatures, amount dispensed, and the like), a frozen food product can become deformable. As such, a frozen food product can include, but is not limited to, soft serve ice cream, gelato, frozen yogurt, ice milk, frozen custard, frozen ice shavings, frozen flavored drinks, and the like, and can further include any type of pelletized frozen food product.

The term "edible food divider" as used herein refers to a functional food product which may be partially or completely edible and which can be placed next to and/or between different types of food products, such as between solid food products and/or semi-solid food products or between different types of solid food products and/or semi-solid food products. An edible food divider can also be used to divide portions of a single type or flavor of food product.

The term "edible frozen food divider" as used herein refers to a functional food product which may be partially or completely edible. An edible frozen food divider can be placed next to and/or substantially between different types of frozen food products in a container to provide a physical barrier. An edible frozen food divider can also be placed substantially between a frozen a non-frozen food product. An edible frozen food divider can also be placed directly into a single type of frozen food product located in a container to divide it into more than one portion.

The term "cone" as used herein, refers to a product which can be made from the same ingredients used in conventionally formed cones designed to hold or contain frozen food products (e.g., yogurt, ice cream, gelato, and the like). Such conventionally formed cones include waffle cones, sugar cones, plain cones, as well as coated cones (e.g., chocolate dipped cones), and the like. A cone may also refer to a product made, at least in part, from ingredients other than those used in conventionally formed cones, but which possesses properties, such as sufficient hardness and brittleness, i.e., is frangible, thus allowing it to function as an edible frozen food divider, which can be easily broken apart, if desired. Therefore, when used without qualification, the term "cone," as used herein, is not intended to convey a particular shape or type of container.

The term "type" as used herein can refer to a food product's overall ingredient content and/or flavoring and/or additives and/or texture and/or shape and/or any other distinguishable property or properties, as compared to another food product.

The term "additive" as used herein refers to any type of food ingredient which can be to a food product during manufacture or by a user to a finished food product. A topping or coating is a type of additive which remains visible, at least in part, on a surface of the food product. Additives can include non-nutritive (non-carbohydrate) sweeteners, carbohydrate-based sweeteners, or otherwise, any type of carbohydrate. Additives can include, for example, nutrient and health additives, such as vitamins, minerals, nutraceuticals, and the like.

The term "flavor" or "flavoring" as used herein is intended to broadly refer to any type of organoleptic agent intended to impart a desired taste or tastes. A flavoring can be considered a type of additive. As such, a flavoring may be sweet, sour, savory, nutty, fruity, and the like. Flavorings may also include fats, salts, honeys, cheeses, sugars, sugar substitutes, spices, and the like. Flavorings can further include colors.

The term "container" as used herein refers to any type of holder capable of holding a frozen food product. The container may be reusable or disposable and can be made from any suitable material, such as paper, Styrofoam®, plastic, metal, glass, and combinations thereof, and the like. The container may also be partially or completely edible. Containers can be intended for multiple servings or individual servings and can include, but are not limited to, bowls, cups, cartons, conventionally formed cones, and the like.

The term "embossed design" as used herein refers to any type of carving, molding or stamped design located on a surface in such a manner that the design stands out in relief, i.e., a raised design.

The term "cooking" as used herein refers to heating a food product for consumption.

In one embodiment, the edible food divider (hereinafter "edible divider") is a single layer product which serves as a physical barrier to keep different flavors and/or types of food products (e.g., frozen food products) physically separated, allowing the user to enjoy each flavor and/or type individually, thus increasing the enjoyment of the food product. Recommendations can be provided by the establishment selling the food products as to particular flavor combinations for a given food divider. In one embodiment, the edible divider comprises at least two layers adhered together. In various embodiments, each of said adhered layers has a different flavor and/or texture and/or embossed design. In one embodiment, the adhered layers may be pulled apart so that each flavor may be enjoyed separately and, in one embodiment, may be enjoyed with a recommended or self-selected coordinated flavor of food product (e.g., sour apple food product might be paired with an edible divider (or a layer of an edible food divider) having a sour flavor and a rich chocolate food product might be paired with an edible divider (or a layer of an edible food divider) having a sweet flavor.

The edible food divider described herein can have any suitable size, shape, hardness and brittleness adapted to perform the intended function. In one embodiment, the edible divider is frangible. In some embodiments, the edible divider may have a given size and shape adapted to receive at least some support from the sides of a container into which it is placed.

In one embodiment, the edible divider has a shape which is substantially rectangular, substantially square, substantially circular, substantially oval, substantially oblong, and the like, or any type of polyhedron type shape having five or more edges. The edible divider can also be custom made in any shape desired by a retailer or end user, such as any regular or irregular shape including a football shape, star shape, tear shape, heart shape, and the like. Such shapes can include, but are not limited to, the shape of objects, animals, plants, and the like, or portions and combinations thereof, (e.g., a human or animal face with a hat).

In the embodiment shown in FIG. 1, the edible divider 100 has a first face 101 with an upper portion 103 and a lower portion 105 and a second face (not shown) opposing the first face 101, which is substantially the same in appearance, texture, shape and size, although the invention is not so limited. In some embodiments, additional edible features (e.g., additives adhered to a surface) and/or designs and/or surface textures and/or any type of customization may be included on the first face 101 and not on the second face and vice versa.

In one embodiment, the edible divider 100 has four side edges including a bottom edge 102, a first side edge 104 adjacent to the bottom edge 102 on one end, a second side edge 106 opposing the first side edge 104 and adjacent to the bottom edge 102 on an opposing end, and a top edge 108 contiguous with the first and second side edges 102 and 104. In various embodiments, the bottom edge 102 and/or top edge 108 can be longer or shorter than the first and second side edges 104 and 106, respectively. In various embodiments, the top edge 108 can be substantially straight or curvilinear.

In the embodiment shown in FIG. 1, the bottom edge 102 has a bottom edge length 102a and each of the opposing side edges, 104 and 106, has a length, namely a first side edge length 104a and a second side edge length 106a, respectively, each of which are substantially the same, and both of which are greater than the bottom edge length 102a, although other configurations are possible. In this embodiment, the top edge 108 of the upper portion 103 has a substantially curvilinear or bowl shape, which is convex in relation to the lower portion 105 of the edible divider 100. In this embodiment, the upper portion 105 containing the top edge 108 has minor axis 105a and a major axis 105b as shown in FIG. 1. The minor axis dimension in this embodiment provides additional height or length to the edible divider 100 beyond the height or length provided by the lower portion 105, and represents the maximum height of the edible divider 100.

In various embodiments, the bottom edge 102 and/or each of the first and second side edges 104 and 106, respectively, may have any suitable shape to substantially match the curvature of a container into which it is placed. In one embodiment, the edible divider 100 has a concave shape along at least one edge. In one embodiment, the edible divider 100 has a convex shape along at least one edge.

The edible divider 100 can also be sized to accommodate any type of cover/lid. In one embodiment, the edible divider 100 has a curved top edge which can be accommodated by a conventional domed cover/lid (See, for example, 1475, FIG. 14). In one embodiment, the edible divider 100 has a flat upper edge to accommodate a flat cover/lid.

Depending on the container size and shape, the edible divider 100 can resemble the shape of a cross-section of a cupcake-shaped food product, such as in FIG. 1. In the embodiment shown in FIG. 1 the first and second side edges 104 and 106, respectively, are at an obtuse angle to the bottom edge 102. Such a configuration can be useful in commonly used single serve containers which have a similar configuration (See, for example, FIGS. 9-12). In one embodiment, the first and second side edges 104 and 106, respectively, are substantially perpendicular to the bottom edge 102. In one embodiment, each of the first and second side edges 104 and 106, respectively, are at an acute angle to the bottom edge 102.

The minor axis 105a can have any suitable size, including any suitable size in relation to other dimensions of the edible divider 100. In one embodiment, the minor axis 105a and each of the first and second side lengths (104a, 106a) are substantially the same size. In one embodiment, the minor axis 105a is either larger or smaller than each of the first and second side lengths (104a, 106a). In one embodiment, the minor axis 105a is at least 25%, such as at least 30%, at least 33%, at least 35%, at least 35.8%, at least 36.5%, at least 41.1%, at least 42.7% at least 45%, at least 45.6%, up to at least 50% of the dimension each of the first and second side lengths, 104a and 106a, including any value therebetween, such as at least 33% up to at least 45.5%, including any range therebetween.

The first and second side lengths (104a, 106a) can have any suitable size, including any suitable size in relation to other dimensions of the edible divider 100. In one embodiment, each of the first and second side lengths (104a, 106a) is at least 50%, at least 55%, at least 60%, at least 63%, at least 63.6%, at least 65%, at least 66.7%, at least 70%, at least 74.6%, at least 79.7%, at least 80%, at least 84.3%, at least 86.2% of the bottom length 102, including any value therebetween, such as at least 63.6% up to at least 86.2%, including any range therebetween.

The bottom length 102a can be any suitable size. In one embodiment, the bottom length 102a is substantially the same or greater than the major axis 105b. In the embodiment shown in FIG. 1, the bottom length 102a is smaller than the major axis 105b. In one embodiment, the bottom length 102a is at least 80%, at least 85%, at least 84%, at least 84.3%, at least 84.9%, at least 85.8%, at least 86.4%, at least 86.6%, at least 87.2% of the bottom length 102a, including any value therebetween, such as at least 84.3% up to at least 87.2%, including any range therebetween.

In a particular embodiment, the bottom length 102a is about 6.6 to about 7.6 cm, each of the first and second side edges (104a, 106a) is about 4.8 to about 5.8 cm, with the minor axis 105a adding about 1.7 to 2.1 cm to the height, and the major axis 105b having a dimension of about 8 to about 8.4 cm. In one embodiment, the edible divider 100 has a bottom length 102a of about 7.1 cm, first and second side lengths (104a, 106a) of about 5.3 cm, a minor axis 105a of about 1.9 cm to produce an overall height (e.g., 105a+106a) of about 7.2 cm, and a major axis of about 8.2 cm. Such an embodiment may be useful in the commonly used 8 oz. size containers.

In a particular embodiment, the bottom length 102a is about 7.4 to about 8.4 cm, each of the first and second side edges (104a, 106a) is about 5.8 to about 6.8 cm, with the minor axis 105a adding about 2.1 to 2.5 cm to the height, and the major axis 105b having a dimension of about 9.1 to about 9.5 cm. In one embodiment, the edible divider 100 has a bottom length 102a of about 7.9 cm, first and second side lengths (104a, 106a) of about 6.3 cm, a minor axis 105a of about 2.3 cm to produce an overall height (e.g., 105a+106a) of about 8.6 cm, and a major axis of about 9.3 cm. Such an embodiment may be useful in the commonly used 12 oz. size containers.

In a particular embodiment, the bottom length 102a is about 9.7 to about 10.7 cm, each of the first and second side edges (104a, 106a) is about 6.3 to about 7.3 cm, with the minor axis 105a adding about 2.5 to about 3.1 cm to the height, and the major axis 105b having a dimension of about 11.4 to about 12 cm. In one embodiment, the edible divider 100 has a bottom length 102a of about 10.2 cm, first and second side lengths (104a, 106a) of about 6.8 cm, a minor axis 105a of about 2.8 cm to produce an overall height (e.g., 105a+106a) of about 9.6 cm and a major axis of about 11.7 cm. Such an embodiment may be useful in the commonly used 20 oz. size containers.

In a particular embodiment, the bottom length 102a is about 10.2 to about 11.2 cm, each of the first and second side edges (104a, 106a) is about 6.3 to about 7.3 cm, with the minor axis 105a adding about 2.8 to about 3.4 cm to the height, and the major axis 105b having a dimension of about 12.2 to about 13.2 cm. In one embodiment, the edible divider 100 has a bottom length 102a of about 10.7 cm, first and second side lengths (104a, 106a) of about 6.8 cm, a minor axis 105a of about 3.1 cm to produce an overall height (e.g., 105a+106a) of about 9.9 cm, and a major axis of about 12.7 cm. Such an embodiment may be useful in the commonly used 24 oz. size containers.

In a particular embodiment, the bottom length 102a is about 10.4 to about 11.4 cm, each of the first and second side edges (104a, 106a) is about 8.9 to about 9.9 cm, with the minor axis 105a adding about 2.8 to about 3.4 cm to the height, and the major axis 105b having a dimension of about 12.2 to about 13.2 cm. In one embodiment, the edible divider 100 has a bottom length 102a of about 10.9 cm, first and second side lengths (104a, 106a) of about 9.4 cm, a minor axis 105a of about 3.1 cm to produce an overall height (e.g., 105a+106a) of about 12.5 cm, and a major axis of about 12.7 cm. Such an embodiment may be useful in the commonly used 32 oz. size containers.

In various embodiments, the edible divider 100 has an overall surface area sufficiently sized to block contact between most of the first and second food products. In one embodiment, the surface area and/or aspect ratio is sufficiently large to prevent contact of any portion of the first and second food products. In one embodiment, the overall surface area is at least at least 4 $cm^2$, at least 5 $cm^2$, at least 6 $cm^2$ at least 7, at least 8 $cm^2$, at least 9 $cm^2$, at least 10 $cm^2$, at least 20 $cm^2$, at least 30 $cm^2$, at least 40 $cm^2$, at least 50 $cm^2$, or more such as up to 100 $cm^2$, or more, including any range there between. In one embodiment, the surface area ranges from about 45 $cm^2$, to about 80 $cm^2$ including any range there between. In one embodiment, the aspect ratio is about 1:1 or higher, such as about 2:1 or 3:1. In one embodiment, the aspect ratio is about 1:2 or about 1:3.

The edible divider 100 can have any suitable weight, which can vary depending on the intended use. In one embodiment, the edible divider has a weight of about 0.1 to about 5 oz., or higher, including any range therebetween. Such higher weights may be useful in embodiments other than individual servings and/or other than embodiments in which the consumer pays based on the weight of the edible divider. In one embodiment, the edible divider has a weight of about 0.1 to about 4 oz., such as between 0.1 and about 3 oz., such as between 0.1 and about 2 oz., such as between 0.1 and about 1 oz., such as between about 0.2 and about 0.9 oz., such as about 0.3 and about 0.9 oz., including any range therebetween.

In one embodiment, the edible divider 100 is particularly suited for an 8 oz. container and has a weight of about 0.3 to about 0.5 oz. In one embodiment, the edible divider 100 is particular suited for a 12 oz. container and has a weight of about 0.4 to about 0.6 oz. In one embodiment, the edible divider 100 is particularly suited for a 16 oz. container or a 24 oz. container and has a weight of about 0.5 to about 0.7 oz. In one embodiment, the edible divider 100 is particular suited for a 20 oz. container and has a weight of about 0.4 to about 0.7 oz. In one embodiment, the edible divider 100 is particular suited for a 32 oz. container and has a weight of about 0.7 to about 0.9 oz.

Figure 2:
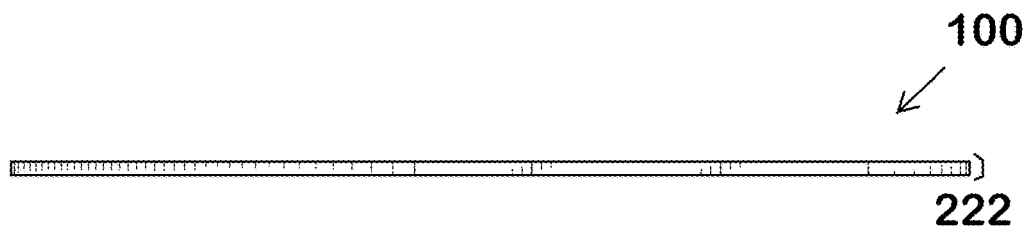
FIG. 2 is a front view of a customized edible food divider according to an embodiment.

The edible divider 100 can have any suitable thickness 222, as shown in the bottom view illustration of FIG. 2. The thickness can vary, depending on the intended use, and is typically the same throughout, although the invention is not so limited. In various embodiments, however, the edible divider 100 does not have a thickness 222 sufficient to allow it to remain "standing" when placed on end, without support from the food product and/or the container. In one embodiment, the edible divider 100 ranges from about 1 mm to about 50 mm in thickness, such as from about 1 to about 45 mm, such as from about 1 to about 40 mm, such as from about 1 to about 30 mm, such as from about 1 to about 20 mm, such as from about 1 to about 10 mm, such as from about 2 to about 10 mm, such as from about 1 mm to about 8 mm, such as from about 2 to about 5 mm, such as about including any range therebetween for all stated ranges.

In one embodiment, the edible divider 100 has a thickness ranges from about 2 to about 10 mm, such as about 2 to about 5 mm, including any ranges therebetween, and a weight ranging between 0.3 and about 0.9 oz., including any range therebetween.

Any corners present on the edible divider 100 may be sharp or rounded. Referring again to FIG. 1, corners 110 and 112 in the lower portion 105 of this embodiment are significantly rounded. In other embodiments, the corners 110 and 112 may be less rounded (e.g., FIG. 7).

The edible divider 100 can have any suitable type of edge surfaces. In one embodiment, the edible divider 100 has smooth rounded edge surfaces on all sides, such as the edge surfaces on the bottom edge 102, the first side edge 104, the second side edge 106 and the top edge 108, as shown in FIG. 1. Such an embodiment may be more cost effective by controlling waste produced during manufacturing. In one embodiment, the edible divider 100 has one or more corrugated edge surfaces, such as a corrugated top edge surface on the top edge 108 which can be formed during the cooking and/or cutting process.

The edible divider 100 can have any suitable surface texture. In one embodiment, some or all of the surface texture is substantially smooth. In the embodiment shown in FIG. 1, the entire surface of the edible divider 100 has a textured pattern which includes a continuous grid of indented square areas 114 with the surrounding surface higher in comparison; a pattern commonly seen in waffles and waffle cones, as is known in the art. In some embodiments, only a portion of the edible divider 100 has a textured pattern. In other embodiments, the square areas 114 may be raised, with the surrounding surface lower in comparison. In one embodiment, the textured surface can have any of a variety of repeating or non-repeating patterns, including a single pattern of any desired shape or object (e.g., ovals, circles, rectangles, and the like, and/or flower, hearts, etc.). In other embodiments, the edible divider 100 has a substantially smooth surface.

In one embodiment, the surface texture has a tic-tac-toe appearance, comparable to the configuration currently used on the inner surface of a regular ice cream cone bottom. In such an embodiment, the raised portion can be comparable in height to the raised portion in a regular ice cream cone, i.e., roughly about ⅓ to about ½ up to about ⅔ of the thickness of the edible divider 100. In one embodiment, the raised portions has a height from about 1 mm to about 10 mm, including any range therebetween, such as from about 1 mm to about 2 mm. In one embodiment, the edible divider 100 has a thickness of about 3 mm and the raised portions have a height of from about 1 mm to about 2 mm. Use of a less shallow surface texture may, in some embodiments, allow the edible divider 100 to hold or contain an amount of one or more types of food products as the edible divider 110 is being consumed, further enhancing the consumer's experience.

Figure 3:
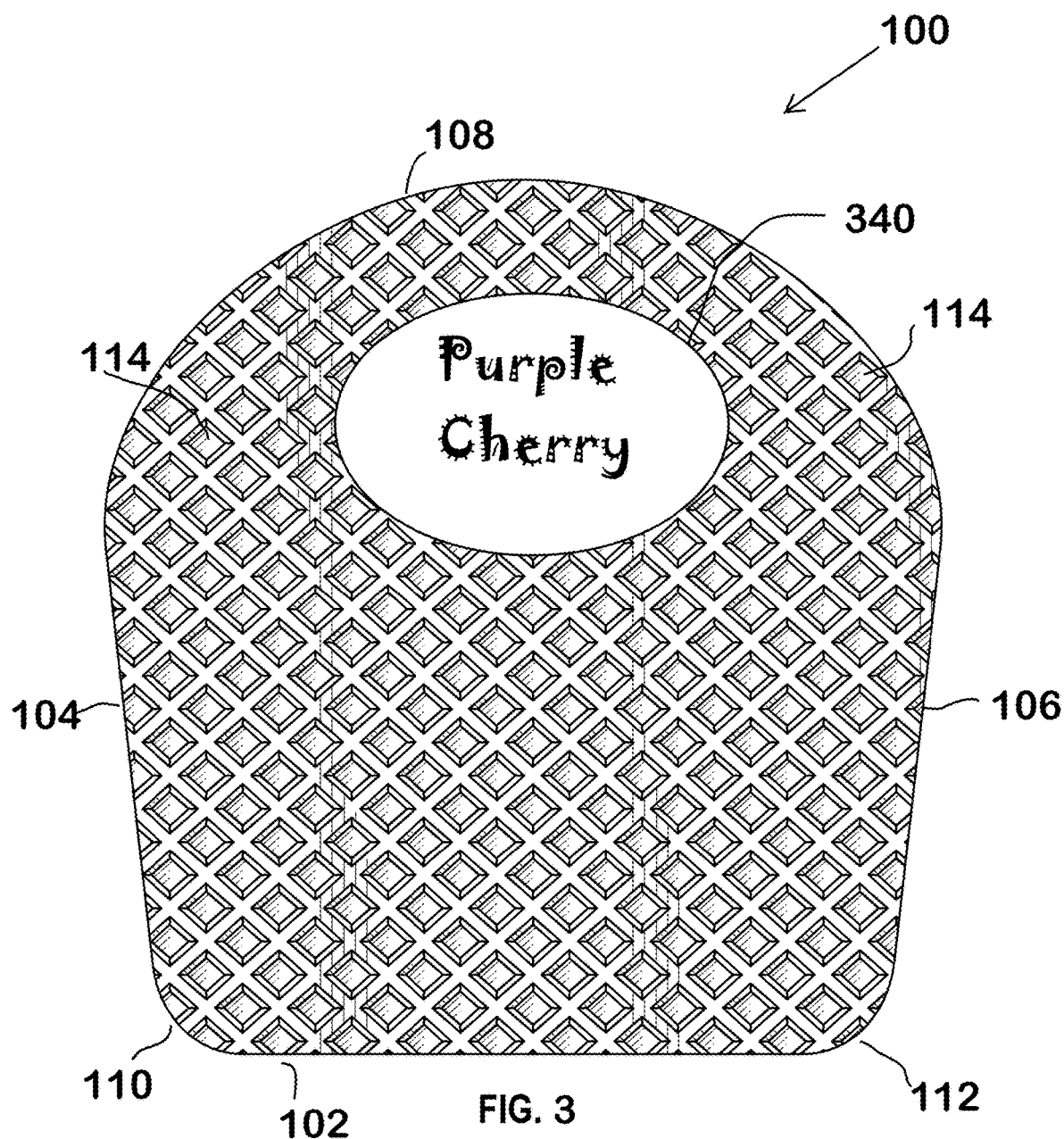
FIG. 3 is a bottom view of an edible food divider of according to an embodiment.

In one embodiment, the edible divider 100 is further customized, such as by color, logo, flavor, patterns, coatings, and the like. In one embodiment, the edible divider contains an embossed design with any of the aforementioned customizations. See, for example, FIG. 3, which contains an exemplary embossed area 340 containing the phrase "Purple Cherry." Such customization may be performed by the edible divider manufacturer at the time of manufacturer or as an add-on after manufacture.

The edible divider 100 can have any suitable taste, such as the taste of a waffle cone. The edible divider 100 can further contain any suitable flavors, which can include sweet, savory, sour, and the like. Such flavors can be adjusted to accommodate the various types of food being separated by the edible divider 100. In one embodiment, the edible divider 100 further includes a non-edible, i.e., inedible portion, such as any type of label, e.g., at least a portion of which may comprise paper. In one embodiment, the inedible portion includes wax. In one embodiment, a quantity of wax is proximate to one or more edges of the edible divider 100. In one embodiment, the quantity of wax comprises a wax base which may allow the edible divider 100 to maintain an upright position without support from the food product or container. Such a wax base may also provide an additional physical barrier to prevent a food product from moving or flowing from one side of the edible divider 100 to another, such as beneath the edible divider 100.

As noted above, the edible divider 100 can be available in multiple sizes to accommodate a variety of container sizes, including, but not limited to, a mini-container (sample) having a 1 ounce (oz.) capacity or larger, such as 2 oz., 4 oz., 8 oz., 12 oz., 16 oz., 20 oz., 24 oz. and 32 oz. containers, including any size container therebetween, further including containers larger than 32 oz., such as up to 64 oz., 128 oz. or higher, to accommodate multiple servings, further including larger food containers in which flavor and/or type division is desirable, including bulk-size food containers, such as cartons, boxes, barrels, and the like. In one embodiment, the edible divider 100 is adapted for use in containers less than 16 oz. In one embodiment, the edible divider 100 is adapted for use in container sizes ranging from 4 oz. to 128 oz., such as 8 oz. to 32 oz., such as 8 oz. to 12 oz., or 8 oz. to 16 oz., or 8 oz. to 24 oz., including any range therebetween.

Figure 4:
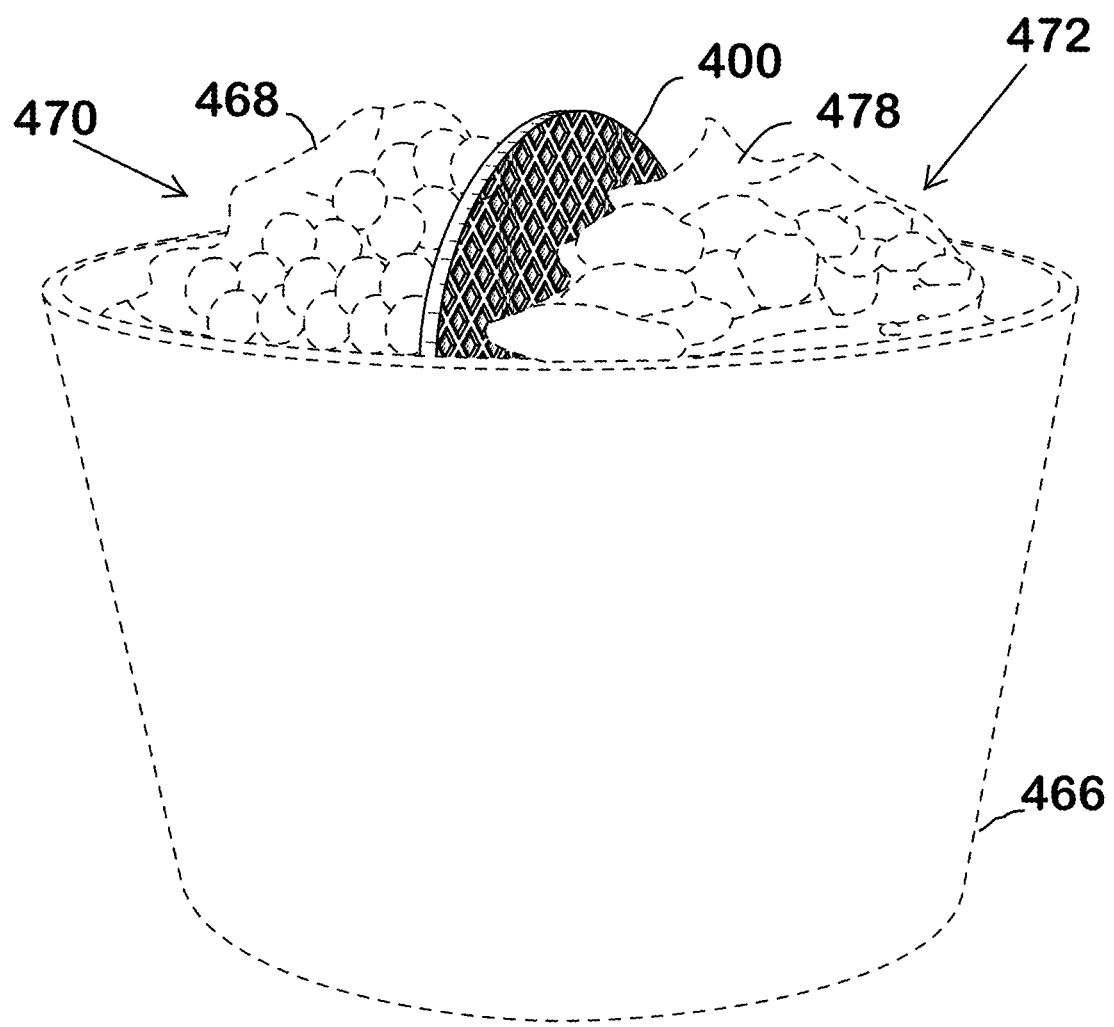
FIG. 4 is a perspective view of an edible food divider in use in a container to divide first and second frozen food products, as well as first and second topping collections according to an embodiment.

See for example, FIG. 4 which shows an edible divider 400 in a container 466 separating first and second frozen food products (468, 478). The first and second frozen food products (468, 478) each further contain a first and second topping collection 470 and 472, respectively.

The edible divider 100 may be used and/or size adjusted for use with any suitable size and shape of container, including containers of any color and/or pattern, including containers for use with hot, warm or cold food products. As such, the edible divider 100 may have, in various embodiments, a length and height comparable to the diameter and height of the container in which it is used. In one embodiment, a taller edible divider 100 may be intentionally coordinated with a container having shorter sidewalls. In such embodiments, a domed cover may optionally be provided to accommodate the edible divider 100. In one embodiment, the edible divider 100 is coordinated with the color and/or pattern on the container to provide a customized product.

Such containers may include standard size containers for frozen food products known by those skilled in the art, in the US or elsewhere, which are often described with reference to an amount of food product which may be contained therein. Such sizes include not only the more common sizes of 8 oz., 12 oz., 16 oz., 20 oz., 24 oz., 32 oz., 64 oz. (½ gallon (gal)) and 128 oz. (1 gal), but also other sizes, including, but not limited to, 3 oz., 5 oz., 5.5 oz., 6 oz., 10 oz., 14 oz., 15, oz., 18 oz., 22 oz., and 26 oz., including any size therebetween, and can further include any size from about 1 oz. to about 2 gal, 3 gal, or higher, including any range therebetween.

In one embodiment, the aspect ratio of the container is about 1:1, 1:2, 1:3 or higher, such as about 1:1 to about 1:3, including any range therebetween. In one embodiment, the aspect ratio may also be 2:1, 3:1 or higher, such as about 1:1 to about 3:1, including any range therebetween. In one embodiment, the container may have a substantially cylindrical shape and in various embodiments, may include tapered sidewalls such that the base dimension or diameter is smaller than the dimension at the top (e.g., lip) of the container (e.g., 966, FIG. 9). In various embodiments, the container may have any regular or irregular shape, which may four or five sidewalls or more. In one embodiment, the container has proportions comparable to the height and diameter of a flat-topped cupcake or muffin. In one embodiment, the container is shorter with proportions comparable to the proportions of a shallow bowl. In one embodiment, the container is taller with proportions comparable to a mug. In one embodiment, the container has proportions comparable to a drinking glass or disposable drinking cup.

In various embodiments, the container has a base dimension ranging from about 2 to about 10 inches, with sidewalls having a dimension ranging from about 1 to about 10 inches. In one embodiment, the container is cylindrically shaped with a base diameter of about 2 to about 5 inches and a side wall of substantially the same size, and an upper diameter about 0% to about 20% larger than the base diameter, such as about 1% to about 10%, such as about 1% to about 5%.

In one embodiment, the base diameter and upper diameter are substantially the same. Examples of such containers may include, but are not limited to a diameter/height (capacity) of at least or no more than each of the following: 3.35/1.93 in (5.5 oz), at least 3.54/2.44 in (8 oz.), at least 3.98/2.95 in (12 oz), 4.41/3.27 (16 oz.), 5/3.07 (20 oz.), 5.59/3.15 (24 oz.) and/or 5.59/4.29 (32 oz.).

In yet other embodiments, a container capacity and diameter may be related as follows with a given container size (in capacity units) having a diameter no more than or at least a given value, including, but not limited to the following: 3 oz./6 mm, 4 oz./75 mm, 5 oz./85 mm, 6 oz./90 mm, 8 oz./95 mm, 10 oz./96 mm, 12 oz./104 mm, 15 oz./117 mm, 16 oz./113 mm, 18 oz./124 mm, 20 oz./125 mm, 22 oz./124 mm, 24 oz./129 mm, 26 oz./125 mm and 32 oz./138 mm.

The containers can be those manufactured and/or sold by any container manufacturer or supplier around the world, including, but not limited to, Joy Cone, Inc., (having offices in Hermitage, Pa. and Flagstaff, Ariz.), Solo® Cup Company (part of the Dart Container Corporation, having offices in Mason, Mich.), Wuhan Xinhengyue Industry & Trade Co., Ltd, Hangzhou Meshine Trading Co., Ltd, and the like. In one embodiment, the containers have sizes and features as described at the following exemplary web sites: kslu48me.en.alibaba.com/product/814546567-210413579/Custom_Cup_for_Frozen_Yogurt.html, www.alibaba.com/product-gs/733595355/wholesale_frozen_yogurt_cup.html, www.myyogurtsupplies.com/Frozen-Yogurt-Supplies_c2.htm and/or at www.carryoutsupplies.com/category/yogurt-cups.html (e.g., Apo Cup®), each of which is incorporated by reference in its entirety.

In one embodiment, the container 466 is used together with any suitable type of lid. In one embodiment, the lid has an arched design, such as a commonly used transparent domed lid. (See, for example, 1475, FIG. 14). Use of domed lids can provider an attractive addition to food choices present within the container.

The edible divider 100 can be manufactured in a variety of ways, including in a batch, semi-batch or continuous manner using any suitable type of cooking method and device. In one embodiment, the cooking comprises baking, toasting, grilling, frying, and combinations thereof. In one embodiment, the edible divider 100 is made in a manner similar to the manner in which waffles are made in a waffle iron having two plates which close together to squeeze batter previously added between the two plates as it cooks. In one embodiment, the waffle iron has a customized imprint in both plates. Such imprint can be altered to add customization before or during production.

Thereafter, the cooked product can be cut into the desired shape and size with any suitable cutting tool. In one embodiment, the shapes are cut out to maximize use of the cooked product with minimal waste. See, for example, FIG. 15, which shows a cutout template 1500 containing a series of cutout shapes 1502 which may be used to cut multiple cooked products into the desired shape with minimal waste. In one embodiment, the cutout shapes 1502 are part of a single cutter intended to cut a large "sheet" of the cooked product. Any excess cooked product may be gathered, optionally, size-reduced, and sold or used as a topping. In one embodiment, excess cooked product has different flavors and/or colors, thus providing any even wider variety of topping.

Figure 15:
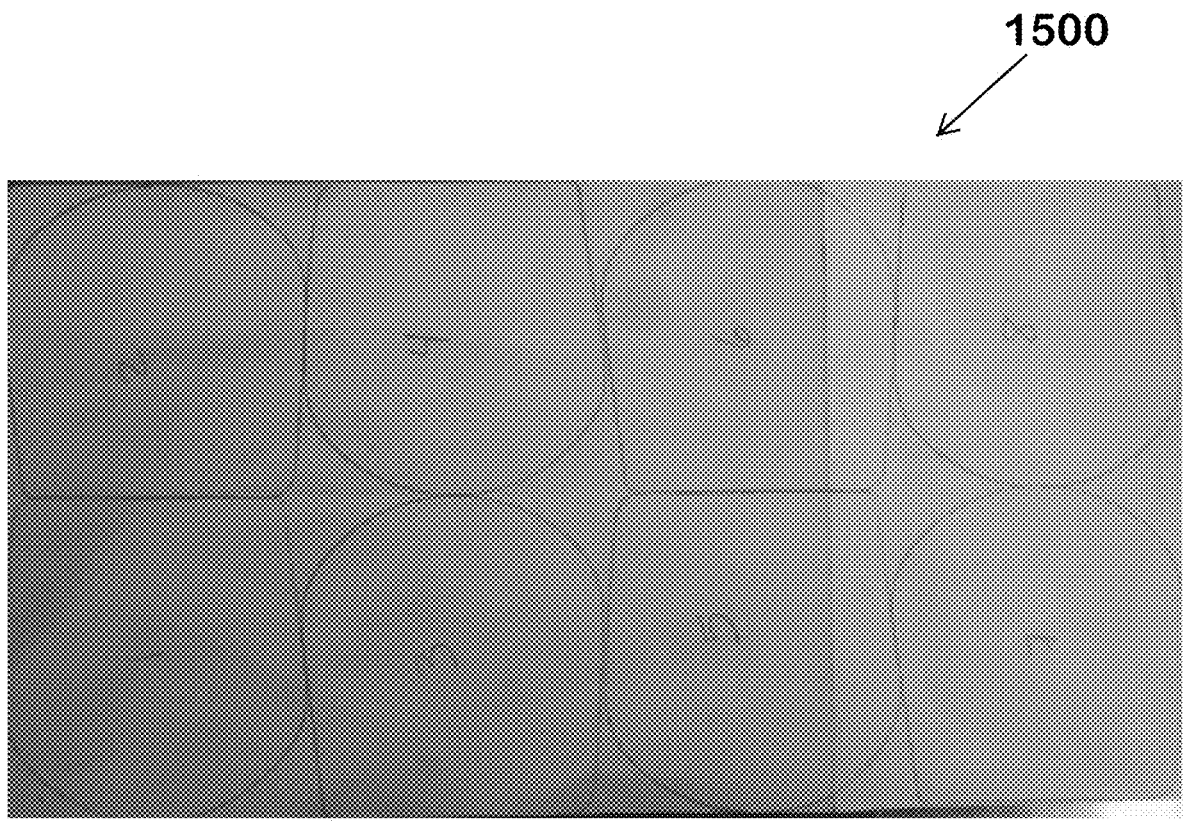
FIG. 15 is a photograph of a cutout template according to an embodiment.

In one embodiment, the cutout shapes 1502 shown in FIG. 15 conform to the shape of a single cooking device (e.g., waffle iron used in Example 1) having top and bottom plates. In one embodiment, the cutout shapes 1502 conform to the shape of a series of cooking devices. In either embodiment, an amount of batter, which may be premeasured to minimize waste, can be added to a preheated bottom plate of one or more cooking devices. Thereafter, a preheated top plate on each of the one or more cooking devices can be lowered and pressed into the batter, which then bakes in between the top and bottom plates to produce the cooked product, which is already formed into the desired shape, i.e., a pre-shaped cooked product, thus eliminating the need for a cutting step. In various embodiments, if excess cooked product is present, such as along the edges, it may be trimmed as desired. In one embodiment, the trimmings are gathered and used or sold as a topping.

In one embodiment, the edible food divider is essentially providing a new use for either a waffle cone or a sugar cone by taking a cone intermediate product and, rather than rolling it, cutting it into a desired shape for use as a divider, rather than a container.

In various embodiments an embossed design can be generated on the edible divider 100 during the cooking process through use of custom upper and/or lower plates in a waffle iron. In various embodiments, ink jet printing can additionally or alternatively be used to add further customization and/or flavoring to the edible divider 100. (See, for example, PCT/US2006/005577 filed on Feb. 17, 2006, which is incorporated by reference in its entirety).

In one embodiment, the edible dividers 100 may be provided in a retail outlet, such as a self-serve yogurt facility, soft-serve facility, or any enterprise serving, selling or providing food products that could benefit from the edible dividers described herein. In one embodiment, the facility charges based on the weight of each edible divider 100. In one embodiment, the edible divider 100 has a fixed price which can vary depending on size, ingredients, coatings, customization, etc.

In one embodiment, the edible divider 100 is available for purchase by a consumer at any type of brick and mortar store, (e.g., grocery store, novelty store, big box store, and the like) or online, for use at home or office. In this embodiment, the edible divider 100 can be either individually or packaged and/or provided as part of a kit containing an array of additives and/or other products for use at home with various food products, such as frozen food products.

In one exemplary use, a self-serve frozen food retailer can locate an array of edible dividers 100 of various sizes at locations conveniently accessed by a consumer, such as together with the containers and/or adjacent to the various flavors and/or types of self-serve frozen food product and/or together with toppings or other additives. In this way, a consumer can place an edible divider 100 in a container prior to and/or during addition of a frozen food product and/or while adding toppings. Related instructions as to the purpose of the edible divider 100 can also be posted in various locations around the store or provided on the edible divider 100 itself.

In one embodiment, the edible divider 100 is placed by the user in the container in a substantially vertical position prior to adding a first food product and held in position by the consumer, by their first product choice and/or by walls of the container. (See, for example, FIG. 9). As such, in some embodiments, the edible divider 100 can be sized to receive at least some support from the sides of the container.

Thereafter, a first food product can be added (e.g., spooned in, poured or dispensed) on one side of the edible divider 100 and a second food product can be added on the opposing side of the edible divider 100.

In one embodiment, the edible divider 100 is placed in the container after the first food product is added by either placing it into or next to the first food product. In some embodiments, the user can push the first food product to one side of the container with the edible divider 100. Thereafter, a second type and/or flavor of food product can be added to the opposing side of the edible divider 100.

In one embodiment, both food products are solid food products (e.g., separate types of toppings, separate collections of toppings, different types or collections of meat, meat and vegetables, and the like). In one embodiment, one food product is a solid food product and one food product is a semi-solid food product (e.g., meat and mashed potatoes, meat and oatmeal, and the like). In one embodiment, both food products are semi-solid food products (e.g., oatmeal and pudding).

In one embodiment, both food products are frozen food products. In one embodiment, only one food product is a frozen food product (e.g., frozen yogurt on one side of the edible divider 100 (with or without toppings) and the other food product on the opposing side of the edible divider 100 is a non-frozen food product (e.g., toppings). In one embodiment, both food products are non-frozen food products (e.g., apples and peanut butter, chips and dip, and the like). In one embodiment, various toppings can be added to a previously added frozen food product. Toppings can include, but are not limited to, nuts, cereal, fruit, candies and/or flavored syrups, and the like.

In one embodiment, at least two types and/or flavors of food products are added to the container and the edible divider 100 is thereafter placed in the desired location to thus separate the two types and/or flavors of food products. In yet other embodiments, only one type of food product is added to the container and the edible divider 100 is used to divide the food product into desired portions.

In one embodiment, the edible divider 100 may optionally be separated (e.g., broken by hand) into multiple edible dividers 100. In one embodiment, the edible divider 100 is perforated in a manner that aids such separation and may allow it to be broken in a manner that each "new" edible divider 100 has substantially the same shape, size and thickness.

In one embodiment, the frozen food product is dispensed from a frozen food dispenser, as is known in the art. In one embodiment, the frozen food product is scooped into a container containing one or more edible dividers 100. In one embodiment, the frozen food product is any type of frozen dessert product.

In one embodiment, one or more edible dividers 100 are placed into a container prior to delivering to the consumer. In such an embodiment, the consumer may receive a food product with previously added edible dividers 100 which divide at least two different types and/or flavors of food products previously added to the container. In one embodiment, three different food products are divided with two edible dividers 100. In one embodiment, at least four different types of food products are divided with three edible dividers 100 placed substantially parallel to each other or at various angles to each other. In one embodiment, three, four or more edible dividers 100 are used to divide the food product into pie or round cake-shaped portions, such that multiple consumers can enjoy the product as served or can otherwise choose to further divide and share the various portions. In one embodiment, the food products are various types and/or flavors of frozen food products. In one embodiment, the food products are a mixture of various types and/or flavors of food products, such as toppings and frozen food products.

The consumer can choose to consume the edible divider 100 at any time during the dining experience, such as when one flavor and/or type of food product has been consumed or after all of the various flavors and/or types of food products have been consumed. In one embodiment, the edible divider 100 may additionally or alternatively be consumed simply for pleasure or treated as a garnish. For example, the user may choose to break the edible divider 100 into one or more pieces and place one or more of the pieces back into the food product(s) or consume the pieces individually.

In one embodiment, a kit is provided which includes a plurality of edible dividers 100 in combination with a set of instructions for use. In one embodiment, containers of a suitable size are also provided with the kit. Such kits can be sold directly to a retailer or can be sold directly to a consumer for use at home.

Embodiments will be further described by reference to the following example, which is offered to further illustrate various embodiments of the present subject matter. It should be understood, however, that many variations and modifications may be made while remaining within the scope of the present subject matter.

EXAMPLE 1

Preparation of Batter

Three (3) whole large eggs from a local supermarket in Marshalltown, Iowa, were beaten with a fork for approximately 1 min. Thereafter ¾ cup of C&H brand pure can sugar was added and mixed with a fork for approximately 1 min. One-half cup of melted Land O'Lakes brand butter and 2 tablespoons of McCormick Brand Pure Vanilla Extract were added and mixed with a fork for approximately 1 min, until smooth. A combination of 1 cup of Gold Medal brand white flour and 1 teaspoon of Argo brand baking powder was then sifted into the mixture and stirred by hand with a fork until smooth (approximately 1 min). The resulting batter had the consistency of conventional waffle batter 552, as can be seen in FIG. 5

Cooking of Batter

A small amount Pam brand cooking spray was sprayed onto the top and bottom plates of a Rival WC800 Waffle Cone Maker preheated to about 325 to 400° F. by being turned on (this model has no temperature settings).

Figure 5:
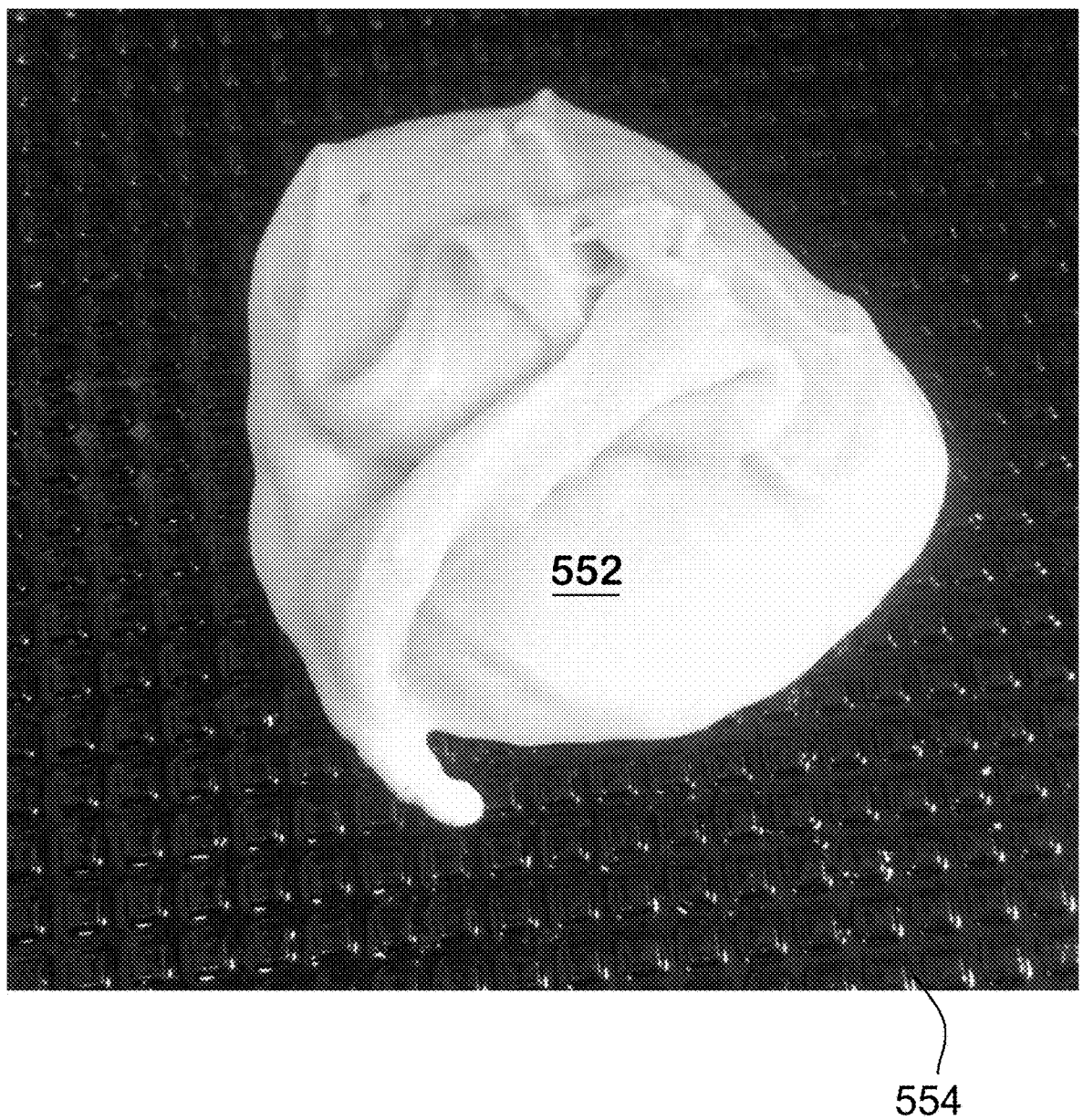
FIG. 5 is a photograph of "edible food divider" batter on a bottom plate of a waffle iron according to an embodiment.
Figure 6:
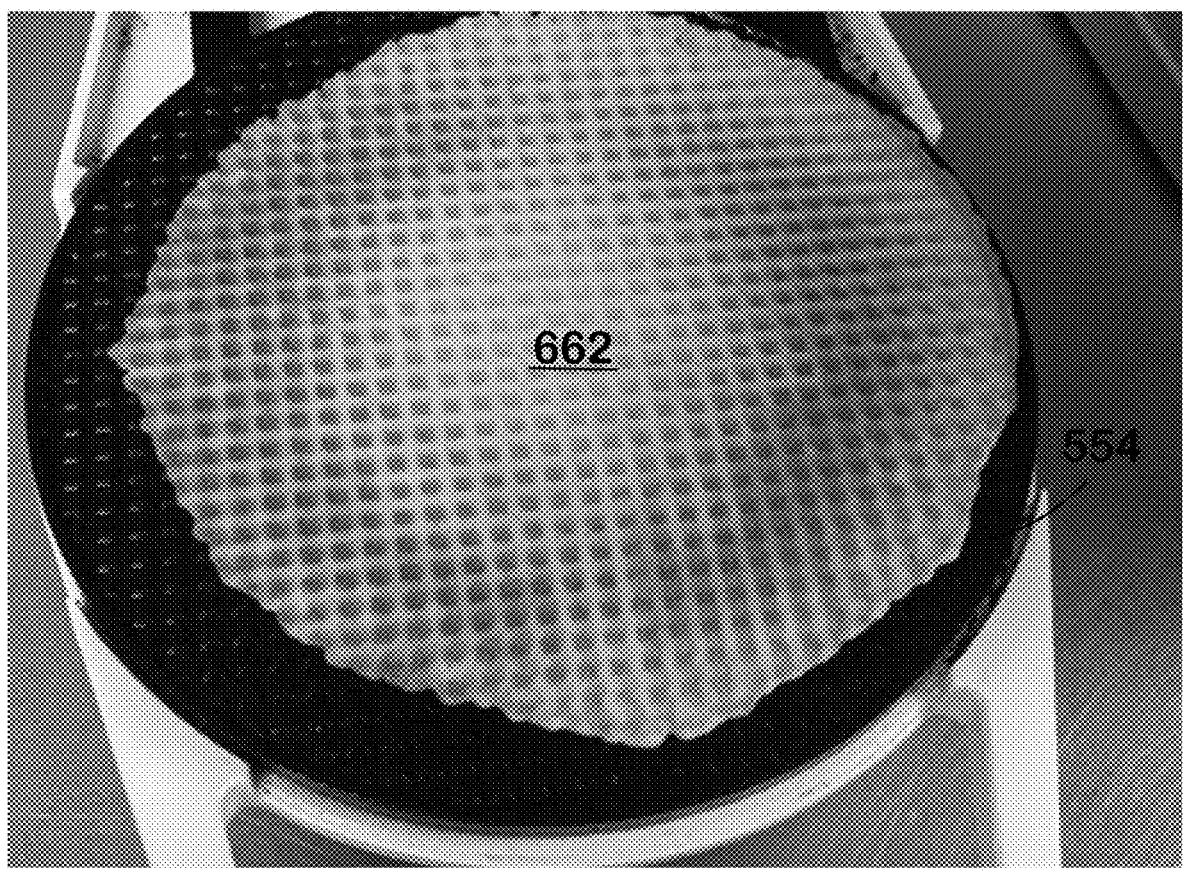
FIG. 6 is a photograph of a cooked frangible food product on a bottom plate of a waffle iron according to an embodiment.

FIG. 5 shows the bottom plate 554 of the waffle iron with about 1 oz. of added batter 552. After the batter 552 was dropped onto the bottom plate 554, the lid of the waffle iron was closed and held firmly in place for approximately 15 seconds. After letting go, the lid was allowed to remain in place about 30 to 45 seconds further. Thereafter the lid was raised to observe the cooked product 662 for the proper/desired brown coloring, as shown in FIG. 6. At this time, the cooked product was removed with a fork and placed on a flat surface.

Figure 7:
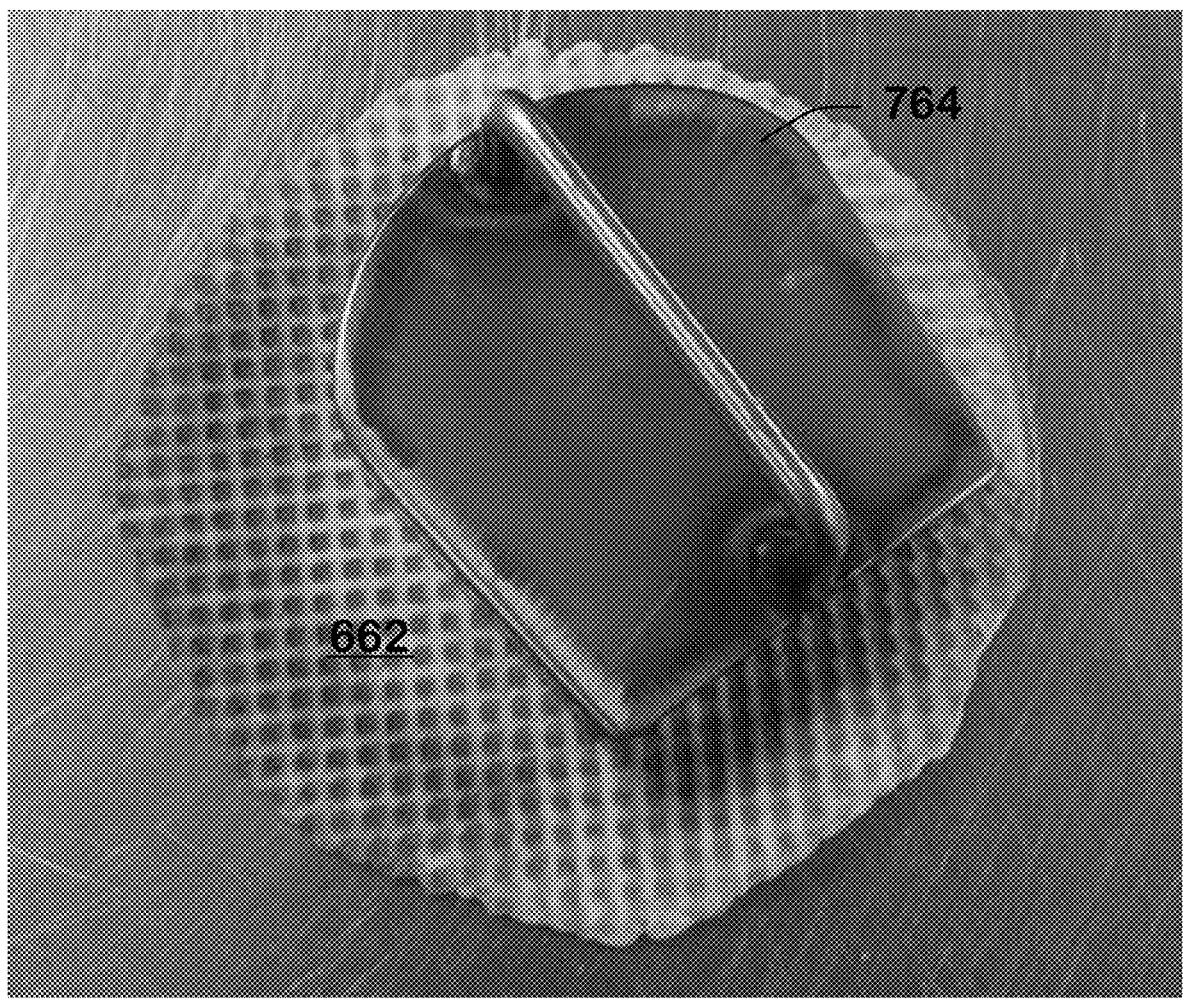
FIG. 7 is a photograph of the cooked frangible food product of FIG. 6 on a flat surface together with a food cutter according to an embodiment.
Figure 8:
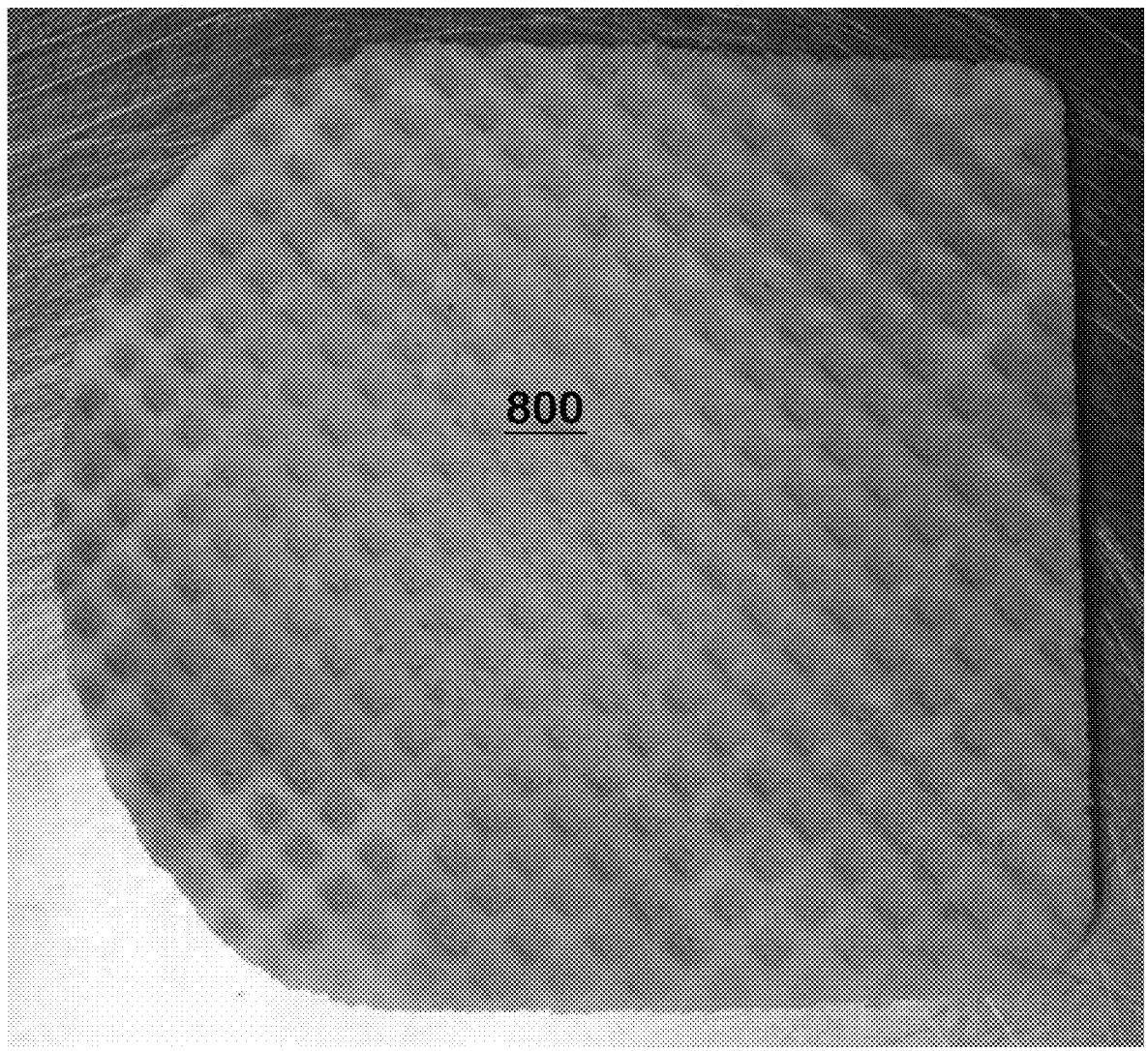
FIG. 8 is a photograph of an edible food divider cut from the cooked frangible food product of FIG. 7 according to an embodiment.

Thereafter, a cookie cutter 764 as shown in FIG. 7 was pressed into the cooked product to cut out the desired shape to produce a number of edible dividers 800, such as the one shown in FIG. 8.

Use of Cut Cooked Food Product

Figure 9:
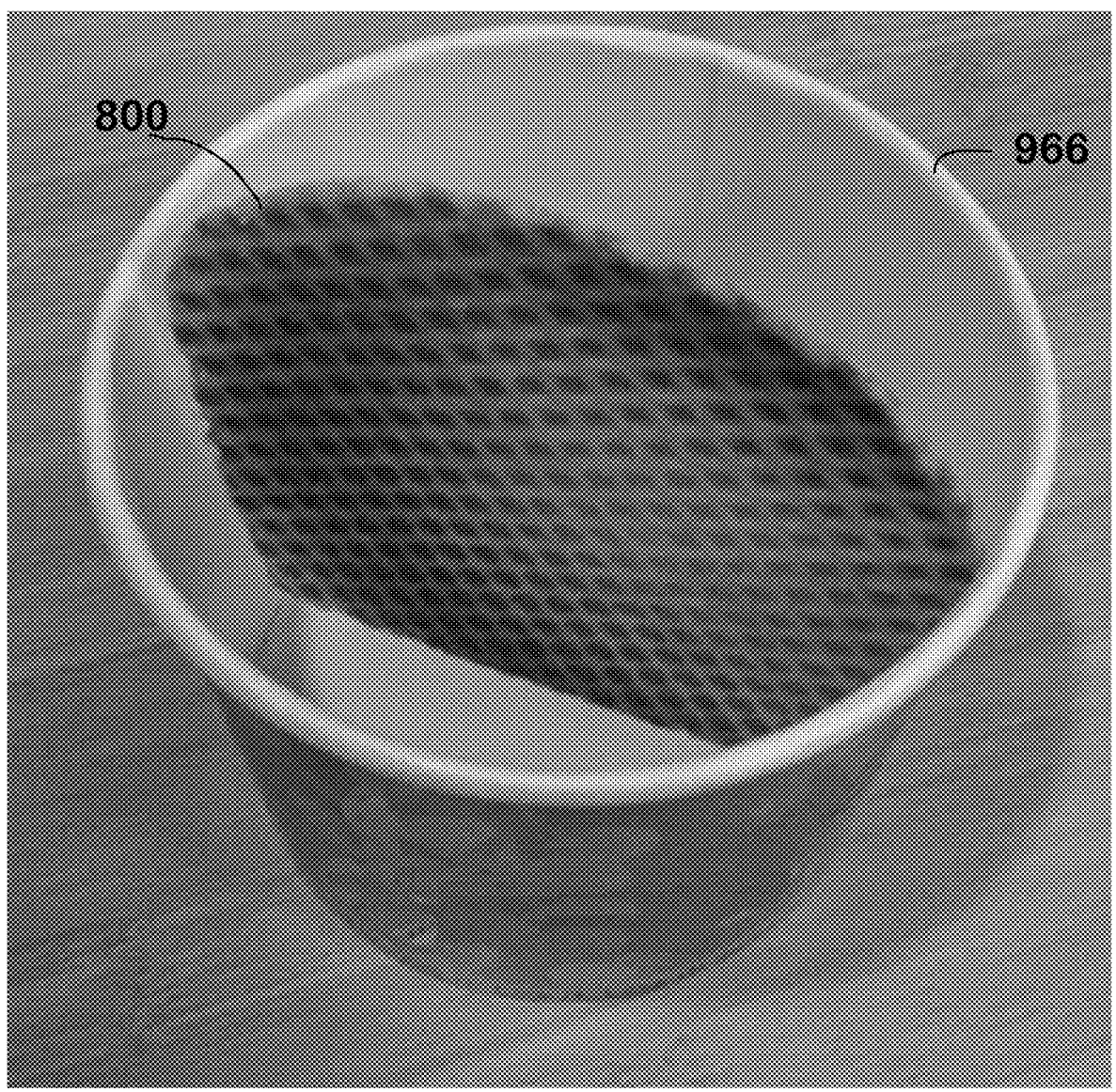
FIG. 9 is a photograph of the edible food divider of FIG. 8 in a container according to an embodiment.
Figure 10:
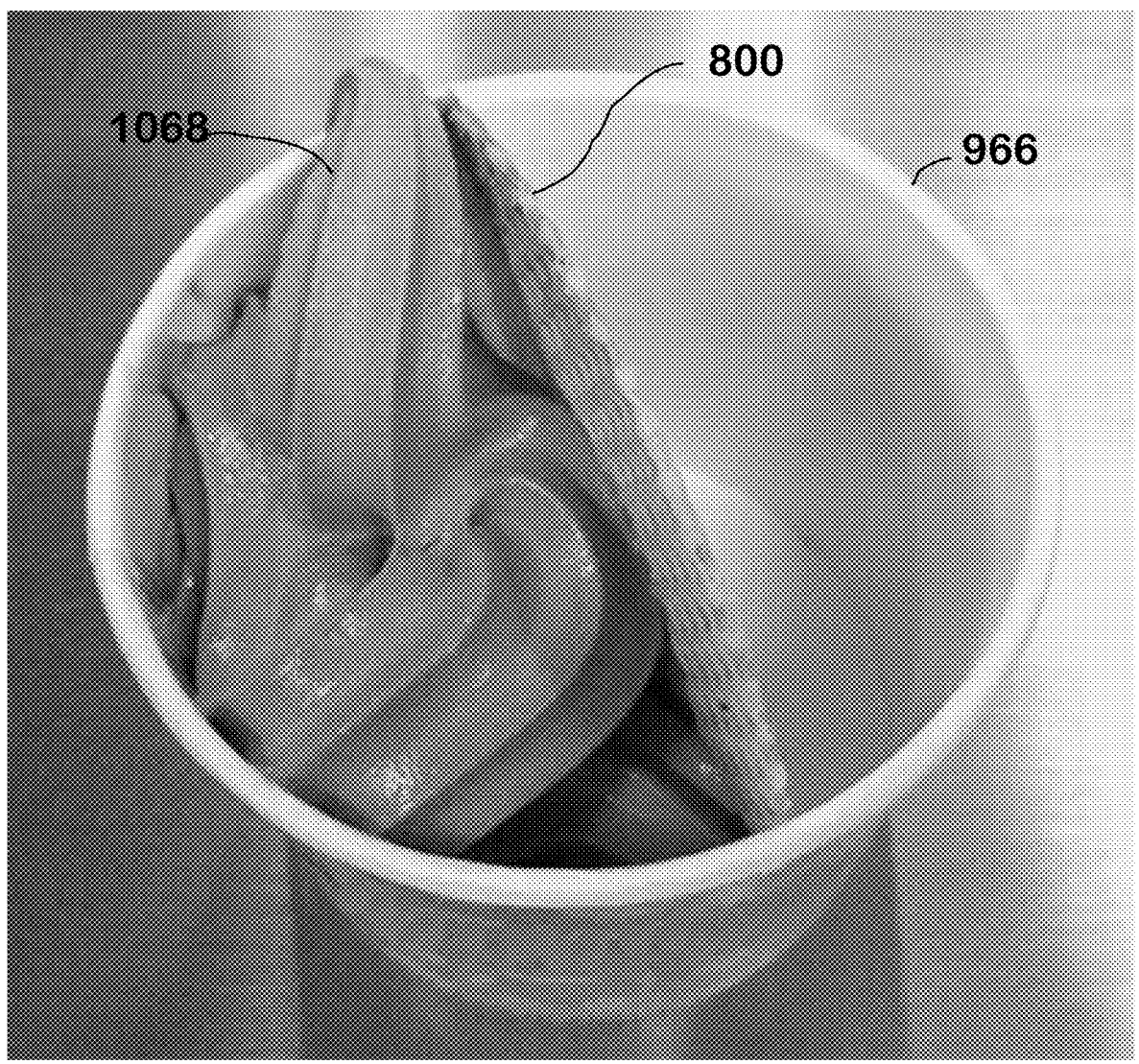
FIG. 10 is a photograph of the edible food divider and container of FIG. 9 with a first frozen food product located adjacent to a first face of the edible food divider according to an embodiment.
Figure 11:
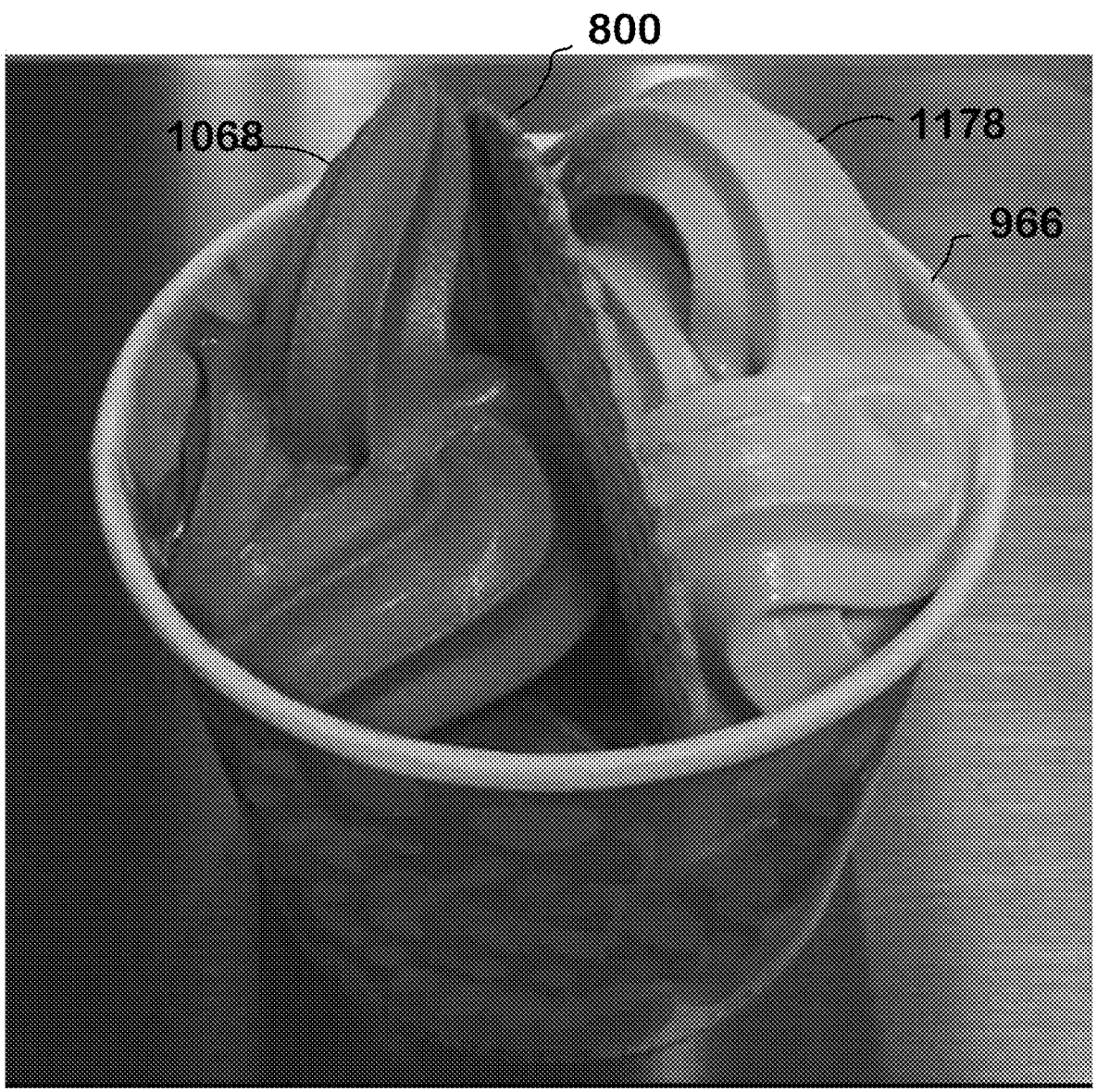
FIG. 11 is a photograph of the edible food divider and container of FIG. 10 with a second food frozen product located adjacent to an opposing second face of the edible food divider according to an embodiment.

Each edible divider 800 was then placed in the middle of a 16 oz. size container 966 as shown in FIG. 9. A first food product 1068 (e.g., chocolate frozen yogurt) was then added as shown in FIG. 10. A second food product 1178 (e.g., raspberry frozen yogurt) was then added as shown in FIG. 11.

In this way, the edible divider 800 served as a wall to barricade the first food product 1068 from unwanted mixing into the empty portion of the container 966. As can be seen in FIG. 11, the edible divider 800 was able to remain substantially erect during placement into the container, i.e., it was not pushed over by addition of the first food product 1068.

Figure 12:
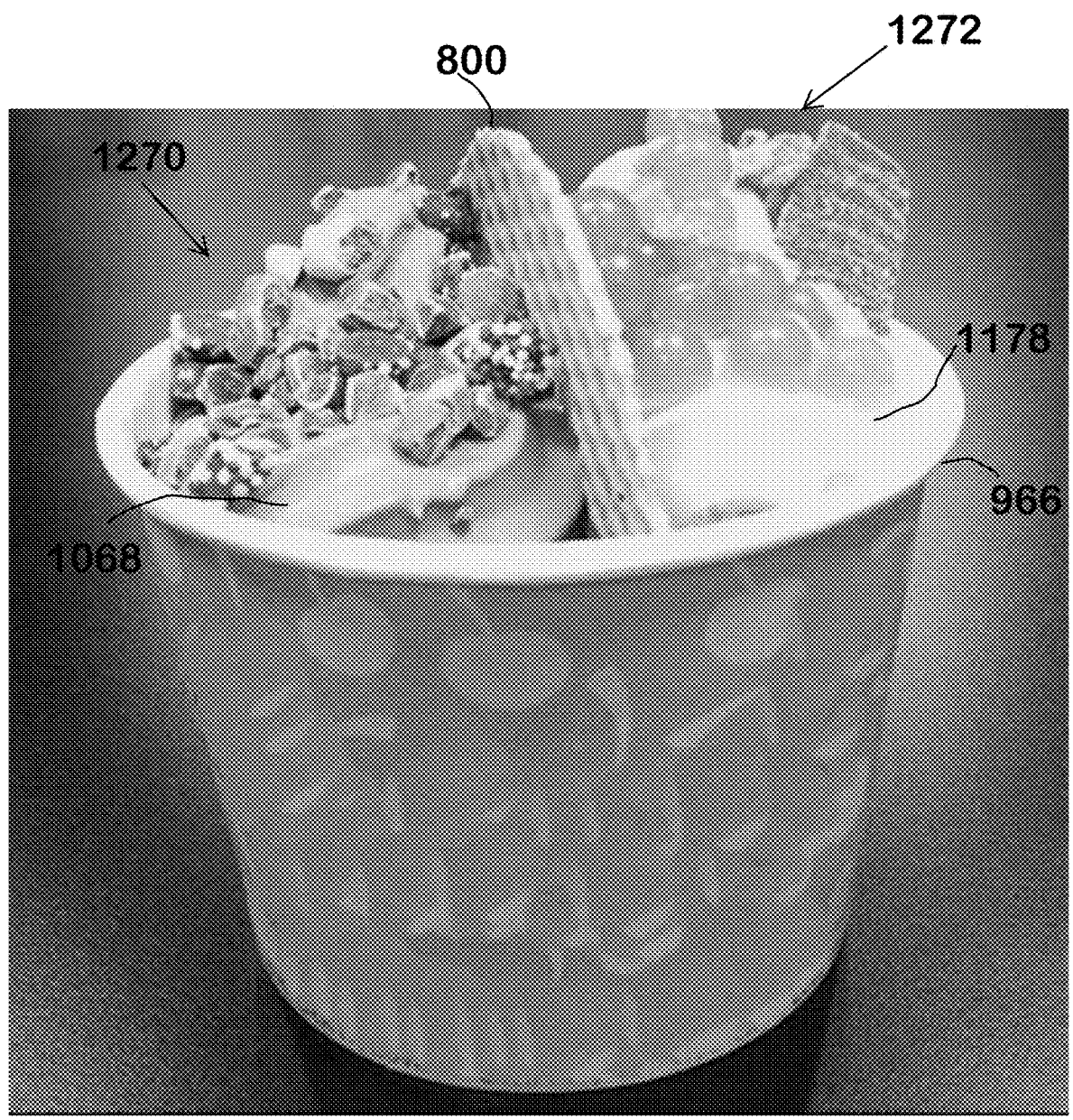
FIG. 12 is a photograph of the edible food divider, container, and first and second frozen food products of FIG. 11 together with first and second topping selections placed on the first and second frozen food products, respectively, according to an embodiment.
Figure 13:
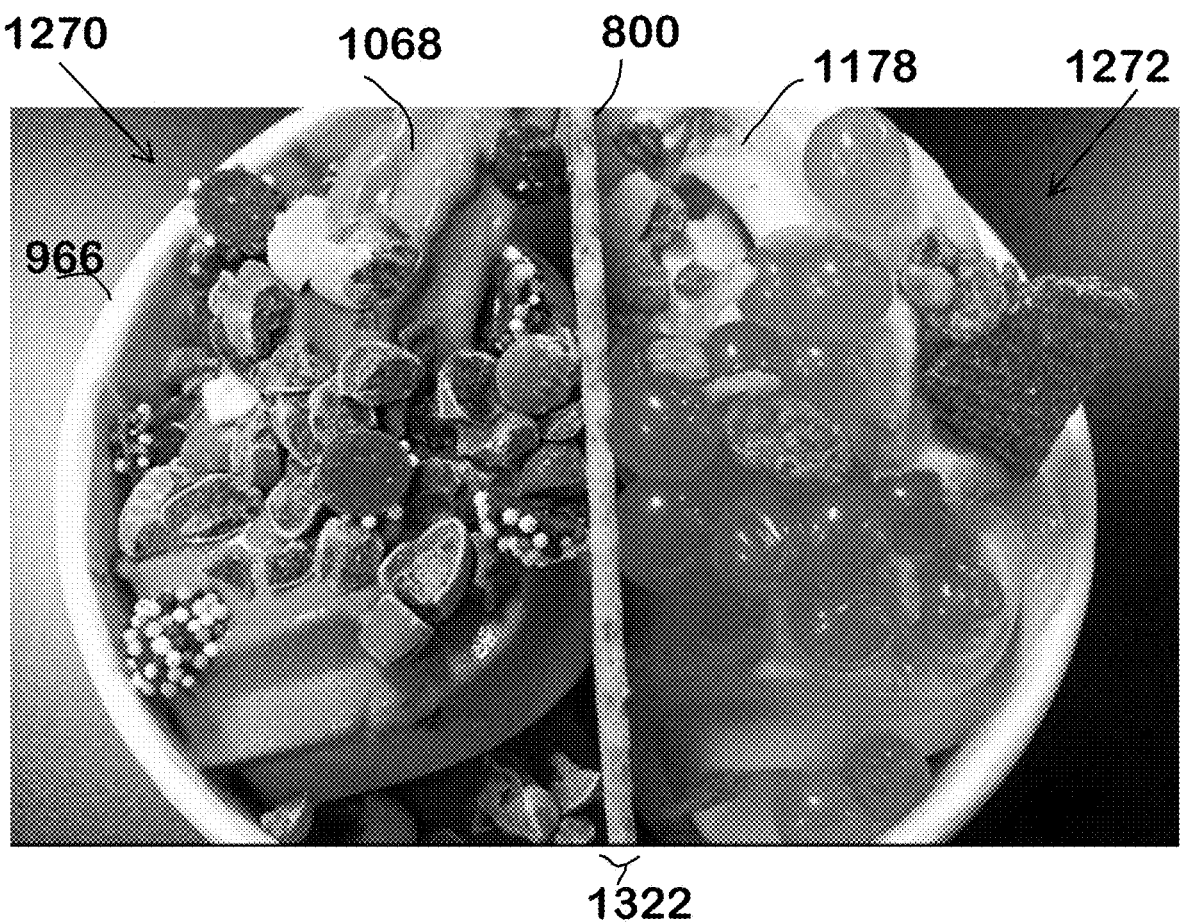
FIG. 13 is a photograph of a top view of the embodiment shown in FIG. 12 according to an embodiment.

The desired topping collections 1270 and 1272 were then added as shown in FIGS. 12 and 13. FIG. 13 also provides a top view of a thickness 1322 of the edible divider 800.

As FIGS. 12 and 13 show, the arched design of the edible divider 800 not only allows the food products (frozen yogurt and toppings alike) to surpass the rim of the container 966, such a design provides more space within a given container 966 on which to add toppings (e.g., 1270, 1272) to the frozen food products (1068, 1178) located on either side of the edible divider 800.

Figure 14:
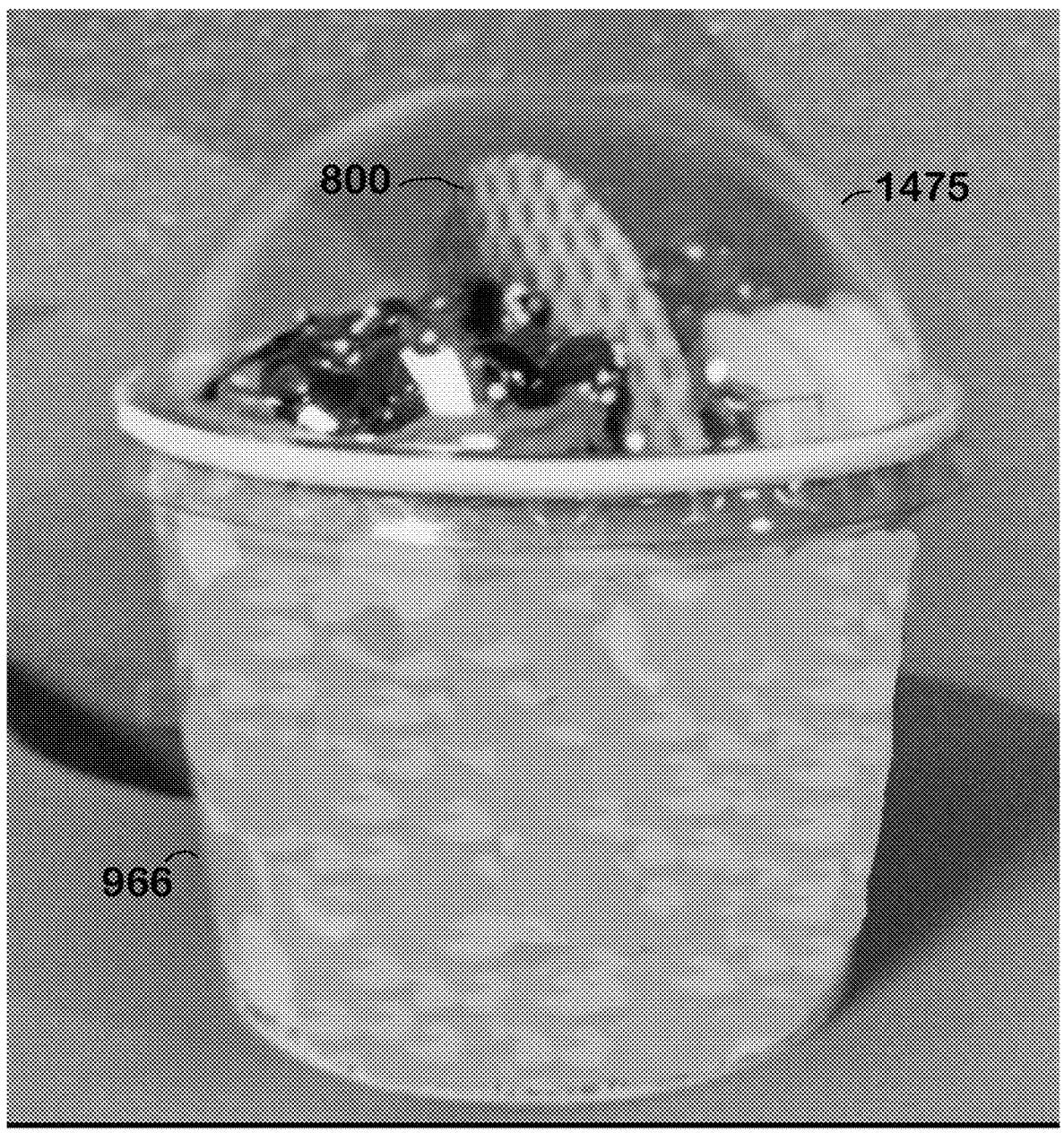
FIG. 14 is a photograph of a domed cover in use with the embodiment shown in FIG. 12 according to an embodiment.

Additionally, as shown in FIG. 14, the arched design of the edible divider 800 also accommodates a conventional domed cover 1475.

The novel edible divider provided herein provides a paradigm shift in the manner in which customers can now enjoy multiple types and/or flavors of food product in a single container. By providing a physical, yet edible barrier to keep food products separated, the consumer can now not only enjoy each flavor and/or type individually, but enjoy a unique food product which itself can be provided in a variety of flavors.

In various embodiments, the edible food divider may optionally have an embossed design throughout or in specified area, including one or more logos and/or edible food divider recipes, flavors and/or colors unique to a particular manufacturer or establishment. In various embodiments, the edible food divider may have some or all of the edges corrugated, such as a corrugated top edge. In various embodiments, the edible food divider may have smooth rounded edges to control waste. In yet other embodiments, the product is customized for a particular customer (e.g., a supplier, franchisee, public or private groups, individuals, etc.) In one embodiment, such options are based upon initial set ups pre-arranged between the manufacturer and the entity or person ordering the dividers.

In one embodiment, an edible divider is provided comprising at least one frangible edible food divider configured to fit within a container (e.g., single serving container of various sizes, e.g., 4 oz., 8 oz., 12 oz., 16 oz., 20 oz., 24 oz. and 32 oz., which may be adapted for use with a domed cover) and adapted to provide a physical barrier between at least two different types, amounts and/or flavors of food products. The edible divider may be comprised of a single layer and can, in various embodiments, which prevents it from remaining standing when placed on edge outside a container, without support from at least one of said food products placed adjacent thereto and/or the container. In various embodiments, the edible divider may have a thickness of about 2 to about 10 mm, such as about 3.2 to about 5 mm, including various ranges there between.

In one embodiment, the food divider has at least two layers which can be temporarily adhered together, capable of being pulled apart so each flavor may be enjoyed separately. Such layers may further have a different flavor and/or texture and/or embossed design. In one embodiment, flavors present on opposing sides in either a single or multiple layer product can be customized to enhance certain food flavors, e.g., sour on one side and sweet on the opposing side.

The food divider can have any suitable shape (e.g., regular, irregular) and texture, such as a smooth texture or a texture comparable to a waffle cone texture. Likewise, the food divider can have any suitable weight, such as from about 0.4 oz. to about 0.9 oz. In various embodiments, the food divider is customized with an embossed design and/or flavors.

In one embodiment, the food divider comprises a bottom, first and second sides adjacent thereto and a fourth curvilinear side adjacent to the two side edges The food products being divided may comprise two more different flavors and/or types of food products. In one embodiment, at least one of the food products is a semi-solid food product, such as a frozen food product (e.g., frozen yogurt or soft serve ice cream). In one embodiment, the food product further includes one or more solid food products, such as additives and/or toppings.

The various embodiments described herein further comprise a method for making a food divider having any suitable texture and comprising cooking a batter at a temperature sufficient to produce a frangible edible food divider configured to fit within a container and adapted to provide a physical barrier between at least two different types, amounts and/or flavors of food products. In one embodiment, the batter is cooked to produce a frangible food product which can further be cut or sized to the desired shape.

A kit is also provided comprising a plurality of frangible edible food dividers configured to fit within a container and adapted to provide a physical barrier between at least two different types, amounts and/or flavors of food products; and instructions for using or selling said frangible edible food dividers.

Although specific embodiments have been illustrated and described herein, it will be appreciated by those of ordinary skill in the art that any procedure that is calculated to achieve the same purpose may be substituted for the specific embodiments shown. This application is intended to cover any adaptations or variations of the present subject matter. For example, although the various embodiments have been described with respect to use with sweet or dessert type items, the edible divider may also be useful with a variety of non-sweet food products. Therefore, it is manifestly intended that embodiments of this invention be limited only by the claims and the equivalents thereof.

What is claimed is:

1. A food divider system comprising:
a single-layer cooked, frangible, and edible food divider having two opposing faces, wherein each face has a lower portion and an upper portion, wherein the upper portion contains a major axis dimension and a minor axis dimension, wherein said edible food divider is consumable without further processing and configured to remain frangible during use, the food divider having a thickness which is substantially the same throughout, and wherein the food divider further comprises a bottom edge having a substantially flat bottom edge length, a contiguous first side edge having a first side edge length, a contiguous second side edge having a second side edge length approximately equal to the first side edge length and wherein the first and second side edges are not parallel to one another between the bottom edge and a fourth curvilinear top edge that is contiguous with the first and second side edges, such that the minor axis dimension being substantially perpendicular to the bottom edge length provides additional length to said edible food divider beyond the first and second side edge lengths and the major axis dimension being substantially parallel to the bottom edge length and providing additional width to the said edible food divider beyond the bottom edge length at one or more widths on the edible food divider; and a container, wherein said edible divider has a shape configured to fit within the container in a substantially vertical position to provide a physical barrier within the container between at least two different types, amounts and/or flavors of frozen food products to prevent commingling, including after said frozen food products have been exposed to ambient temperatures.

2. The food divider system of claim 1 wherein the thickness is of a dimension which prevents said edible food divider from remaining standing when placed on edge, without support from at least one of said food products placed adjacent thereto and/or the container.

3. The food divider system of claim 2 wherein the thickness is in a range of about 2 to about 5 mm.

4. The food divider system of claim 2 wherein the thickness is in a range of about 3.2 to about 10 mm.

5. The food divider system of claim 2 wherein the thickness is in a range of about 1 mm to about 20 mm.

6. The food divider system of claim 1 having a weight from about 0.1 ounce (oz.) to about 3 oz.

7. The food divider system of claim 6 having a weight from about 0.3 oz. to about 2.5 oz.

8. The food divider system of claim 6 having a weight from about 1 oz. to about 2 oz.

9. The food divider system of claim 1 wherein the edible food divider is customized with color, logo, coating, embossed design and/or flavors.

10. The food divider system of claim 1 wherein the container is a single serving container adapted for use with a domed cover.

11. The food divider system of claim 1 wherein the container has a size which corresponds to a capacity of 6 oz., 8 oz., 12 oz., 15 oz., 16 oz., 18 oz., 20 oz., 24 oz., 32 oz., 64 oz. or 128 oz.

12. The food divider system of claim 1 comprising two different flavors and/or types of frozen food products.

13. The food divider system of claim 1 wherein at least one of the frozen food products is frozen yogurt or soft serve ice cream.

14. The food divider system of claim 1, wherein said edible food divider has either a surface texture comprising a substantially smooth texture, a textured pattern on one or both faces, a textured pattern on only a portion of one or both faces, or first and second textured patterns on the opposing faces, wherein the first and second textured patterns have substantially the same appearance, texture, and shape as each other.

15. The food divider system of claim 14, wherein the textured pattern on at least one of the two faces is selected from a repeating pattern, a non-repeating pattern, a single pattern, and combinations thereof.

16. The food divider system of claim 15 wherein the repeating pattern is comprised of a continuous grid of indented substantially square areas.

17. The food divider system of claim 14 wherein the textured pattern includes raised portions having a height of about one-third to about two-thirds the thickness of the frangible edible food divider.

18. The food divider system of claim 14 wherein the first and second textured patterns comprise substantially square raised areas or substantially square indented areas.

19. The food divider system of claim 1 wherein each edge surface is rounded.

20. The food divider system of claim 1 wherein the top edge surface is a corrugated top edge.

21. The edible divider of claim 1 having a surface area and/or an aspect ratio sufficiently large to prevent contact between any portion of said first and second frozen food products.

22. A kit comprising:
a plurality of single-layer, cooked, frangible, and edible food dividers, each divider having two opposing faces, wherein each face has a lower portion and an upper portion, wherein the upper portion contains a major axis dimension and a minor axis dimension, wherein said edible food divider is consumable without further processing and configured to remain frangible during use, the food divider having a thickness which is substantially the same throughout, and wherein the food divider further comprises a bottom edge having a bottom edge length, a contiguous first side edge having a first side edge length, a contiguous second side edge having a second side edge length approximately equal to the first side edge length and wherein the first and second side edges are not parallel to one another between the bottom edge and a fourth curvilinear top edge that is contiguous with the first and second side edges, such that the minor axis dimension being substantially parallel to the bottom edge length provides additional length to said edible food divider beyond the first and second side edge lengths and the major axis dimension being substantially parallel to the bottom edge length and providing additional width to the said edible food divider beyond the bottom edge length at one or more widths on the edible food divider;

one or more containers, wherein each edible divider has a shape configured to fit within one of said containers in a substantially vertical position to provide a physical barrier within the container between at least two different types, amounts and/or flavors of frozen food products to prevent commingling, including after said frozen food products have been exposed to ambient temperatures;

an array of additives selected from non-nutritive (non-carbohydrate) sweeteners, toppings, carbohydrate-based sweeteners, carbohydrates, nutrient additives, health additives, flavorings, and combinations thereof; and instructions for using or selling said frangible edible food dividers, said containers and the array of additives.

23. The kit of claim 22 wherein said edible food divider has a surface texture comprising a substantially smooth texture, a textured pattern on one or both faces, a textured pattern on only a portion of one or both faces, or first and second textured patterns on the opposing faces, wherein the first and second textured patterns have substantially the same appearance, texture, and shape as each other.

24. The kit of claim 23 wherein the textured pattern on at least one of the two faces is selected from a repeating pattern, a non-repeating pattern, a single pattern, and combinations thereof.

25. The kit of claim 24 wherein the repeating pattern is comprised of a continuous grid of indented substantially square areas.

26. The kit of claim 22 wherein the nutrient and health additives are vitamins, minerals and/or nutraceuticals, the flavorings are selected from sweet, sour, savory, nutty, fruit, fats, salts, honeys, cheeses, sugars, sugar substitutes, spice, colors, and combinations thereof.

27. The kit of claim 22 wherein said containers comprise cups, bowls and/or cartons.

28. The kit of claim 22 wherein at least one of said edible food dividers is a coated edible food divider.

* * * * *